US012746744B2

(12) United States Patent
Harada et al.

(10) Patent No.: US 12,746,744 B2
(45) Date of Patent: Sep. 29, 2026

(54) MOISTENING DEVICE, RECORDING SYSTEM, AND INTERMEDIATE UNIT

(71) Applicant: SEIKO EPSON CORPORATION, Tokyo (JP)

(72) Inventors: Yutaro Harada, Shiojiri (JP); Kohei Ueno, Matsumoto (JP); Hirohisa Kodaira, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/991,955

(22) Filed: Dec. 23, 2024

(65) Prior Publication Data

US 2025/0206012 A1 Jun. 26, 2025

(30) Foreign Application Priority Data

Dec. 26, 2023 (JP) ................................ 2023-219004

(51) Int. Cl.
*B41F 23/02* (2006.01)
*B65H 71/00* (2006.01)

(52) U.S. Cl.
CPC ............ *B41F 23/02* (2013.01); *B65H 71/00* (2013.01); *B65H 2406/40* (2013.01)

(58) Field of Classification Search
CPC ...... B41F 23/02; B65H 71/00; B65H 2406/40
See application file for complete search history.

(56) References Cited

U.S. PATENT DOCUMENTS

2005/0158099 A1* 7/2005 Segerer .............. G03G 15/6538 399/407
2006/0133876 A1* 6/2006 Kougami ........... G03G 15/6573 399/407
2015/0043998 A1 2/2015 Janssen et al.
2015/0085010 A1 3/2015 Nishimura
2015/0316890 A1 11/2015 Okuda et al.
2018/0134431 A1* 5/2018 Thienst ................. B65B 51/023

FOREIGN PATENT DOCUMENTS

| | | | | |
|---|---|---|---|---|
| CN | 106054552 A | * 10/2016 | ......... G03G 15/6576 |
| DE | 19958295 A1 | * 6/2001 | ......... G03G 15/6573 |
| JP | H07-015338 U | 3/1995 | |
| JP | 2007-302394 A | 11/2007 | |
| JP | 2014-089278 A | 5/2014 | |
| JP | 2015-063084 A | 4/2015 | |
| JP | 2015-515427 A | 5/2015 | |
| JP | 2015-221722 A | 12/2015 | |
| JP | 2019-052005 A | 4/2019 | |
| JP | 2023140943 A | * 10/2023 | .............. B41J 13/08 |

* cited by examiner

*Primary Examiner* — Christopher E Mahoney
*Assistant Examiner* — Marissa Ferguson-Samreth
(74) *Attorney, Agent, or Firm* — WORKMAN NYDEGGER

(57) ABSTRACT

The moistening device 40 includes a transport section, a spray section 42, and a movement section 46. The moistening device 40 moistens the medium M by spraying the moistening liquid HL thereon. The transport section transports the medium M along the transport direction Y1. The spray section 42 sprays the moistening liquid HL on the medium M transported by the transport section. The movement section 46 moves the spray section 42.

18 Claims, 22 Drawing Sheets

MOISTENING DEVICE, RECORDING SYSTEM, AND INTERMEDIATE UNIT

The present application is based on, and claims priority from JP Application Serial Number 2023-219004, filed Dec. 26, 2023, the disclosure of which is hereby incorporated by reference herein in its entirety.

BACKGROUND

1. Technical Field

The present disclosure relates to a moistening device that moistens a medium by spraying a moistening liquid, a recording system, and an intermediate unit.

2. Related Art

For example, JP-A-2015-221722 discloses an image forming device including a transport section that transports medium and an image forming section that performs recording on the medium with toner or the like.

The image forming device includes a moistening device that sprays a moistening liquid onto a medium. The moistening device has the plurality of ejection ports for spraying the moistening liquid, and a shutter for opening and closing the ejection ports. The ejection ports are arranged side by side in the width direction of the sheet. The shutter opens and closes each ejection port, switches between spraying and non-spraying of the moistening liquid, and ejects the moistening liquid only to a necessary portion. The moistening liquid is sprayed in a fan-shape from the plurality of ejection ports. The width, interval, and spraying angle of the ejection ports are set so that the spraying regions from the adjacent ejection ports to the sheet are overlapped.

However, although the moistening device described in JP-A-2015-221722 can switch between spraying and non-spraying, the position of the ejection port and the spraying angle (ejection direction) are predetermined, and there is room for further improvement in order to optimize moistening. That is, since the position of the ejection port and the spray angle (ejection direction) are determined in advance, there is a problem that the degree of freedom is low and it is difficult to optimize moistening. Therefore, there is a demand for a moistening device capable of optimizing moistening.

SUMMARY

A moistening device for solving the above-described problem, for moistening a medium by spraying a moistening liquid to the medium, the moistening device includes: a transport section configured to transport a medium along a transport direction; a spray section that sprays the moistening liquid onto the medium transported by the transport section; and a movement section configured to move the spray section.

A recording system for solving the above-described problem, the recording system includes: a recording device that performs recording by ejecting liquid onto a medium and the moistening device.

An intermediate unit for solving the above-described problem is provided between a recording device that performs recording on a medium and a post-processing device that performs post-processing on the medium on which recording was performed by the recording device and that transports the medium from the recording device to the post-processing device, the intermediate unit includes: the moistening device and a drying device for drying a medium.

DESCRIPTION OF EMBODIMENTS

Hereinafter, an embodiment of a recording system will be described with reference to the drawings.

Figure 1:
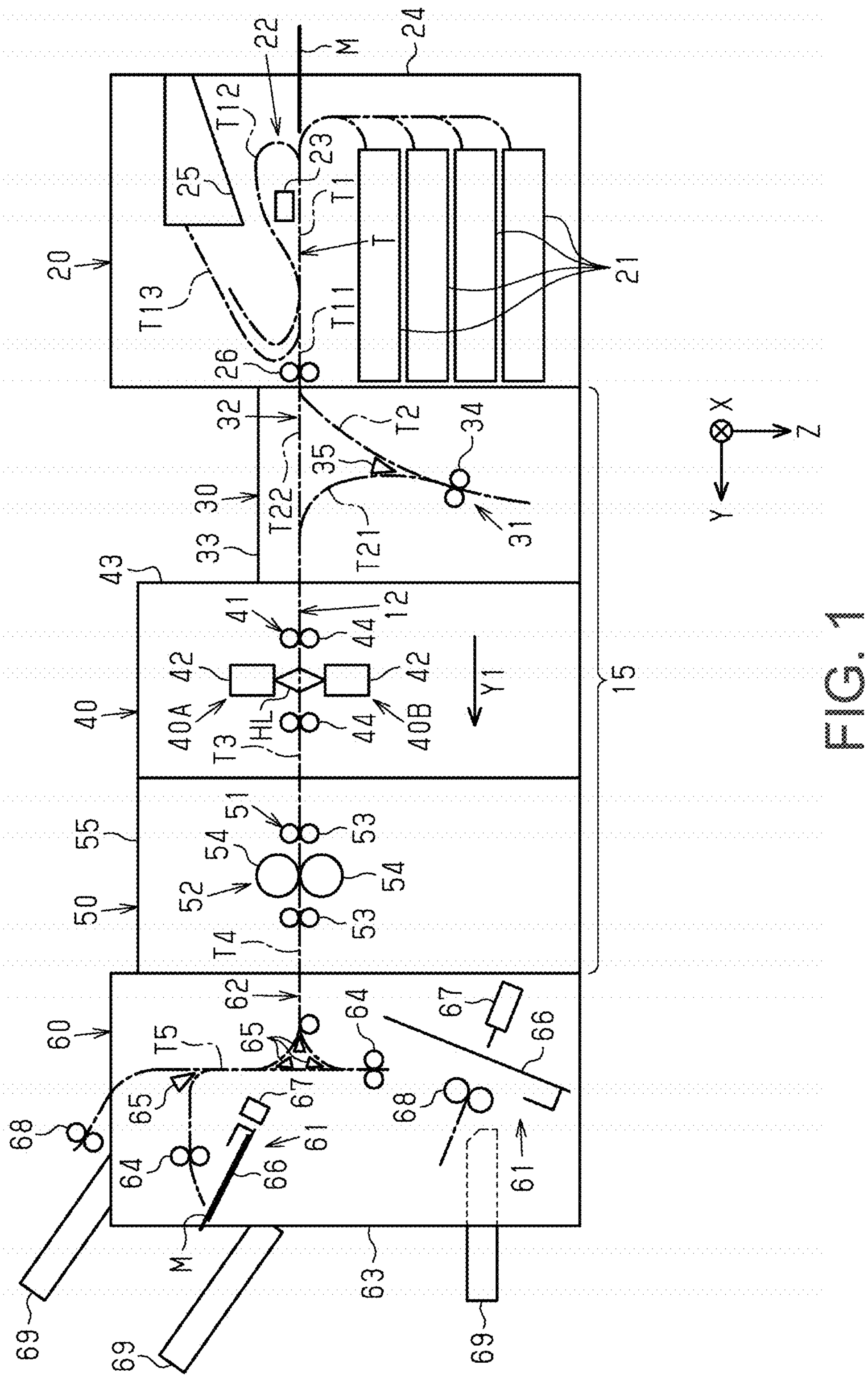
FIG. 1 is a schematic front cross-sectional view illustrating a first configuration of the recording system according to the first embodiment.
Figure 2:
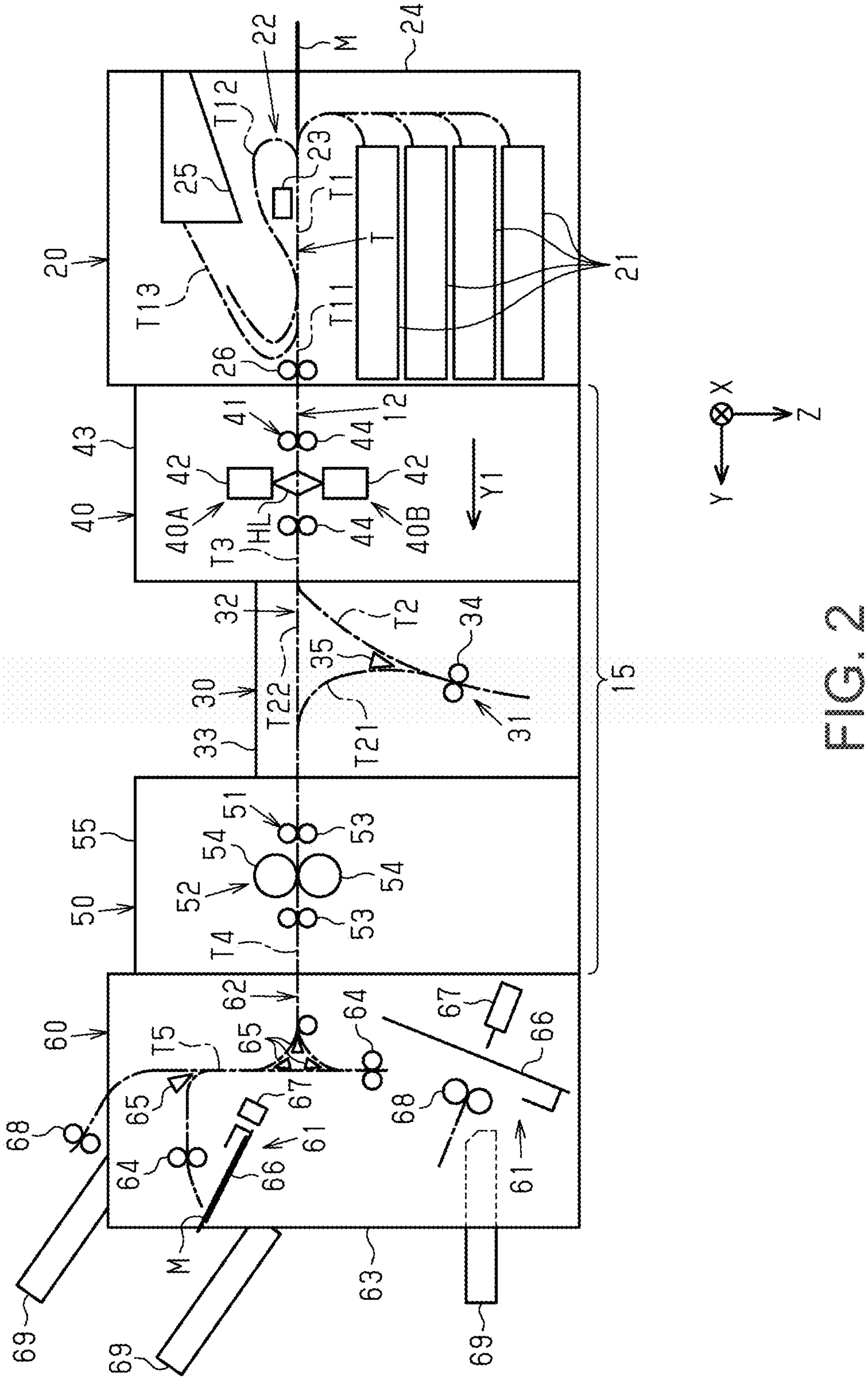
FIG. 2 is a schematic front cross-sectional view illustrating a second configuration of the recording system according to the first embodiment.

As shown in FIGS. 1 and 2, a recording system 10 includes a recording device 20, an intermediate unit 15, and a post-processing device 60. The intermediate unit 15 is arranged between the recording device 20 and the post-processing device 60. The recording system 10 is a system in which the post-processing device 60 performs post-processing on the medium M on which the recording device 20 has recorded characters or images. The intermediate unit 15 performs necessary predetermined processing on the medium M after recording before the post-processing device 60 performs post-processing on the medium M after recording which is discharged from the recording device 20. The intermediate unit 15 sends the medium M subjected to the predetermined processing to the post-processing device 60. The post-processing device 60 performs post-processing on the medium M.

In the recording system 10 illustrated in FIGS. 1 and 2, three directions intersecting with each other (for example, orthogonal to each other) are indicated by an XYZ coordinate system, and are respectively set as an X direction, a Y direction, and a Z direction. The recording system 10 includes a transport path T that passes through the interior of each devices 20, 60, and the like that constitute the recording system 10. Since the X direction is a direction parallel to the width direction of the medium M which is transported along the transport path T in the recording system 10, the X direction is also referred to as the width direction X. Since the Y direction is a direction parallel to a horizontal transport direction in which the medium M is transported in a portion of the transport path T in which the medium M is delivered between the respective devices, the Y direction is also referred to as a transport direction Y. Since the Z direction is a direction parallel to the vertical direction, it is also referred to as a vertical direction Z.

In the example shown in FIGS. 1 and 2, the intermediate unit 15 includes a moistening device 40 and a drying device 50. The intermediate unit 15 may include an inversion device 30. As described above, the intermediate unit 15 of the present embodiment can selectively perform one or more necessary processes among the inversion process, the moistening process, and the drying process on the medium M after recording. As described above, the recording system 10 illustrated in FIGS. 1 and 2 includes the recording device 20, the inversion device 30, the moistening device 40, the drying device 50, and the post-processing device 60.

In the recording system 10 illustrated in FIGS. 1 and 2, the medium M is transported from the recording device 20 positioned on the rightmost side toward the post-processing device 60 positioned on the leftmost side. The medium M is delivered between the devices by being transported in the transport direction Y from the device on the upstream side to the device on the downstream side. In each of the devices 20, 30, 40, 50, and 60, the medium M is also transported in a direction different from the transport direction Y. In other words, in each of the devices 20, 30, 40, 50, and 60 constituting the recording system 10, the medium M are transported in the transport direction Y1 that changes according to the transport position. The transport direction Y1 is a direction orthogonal to the width direction X.

The recording system 10 shown in FIG. 1 is different from the recording system 10 shown in FIG. 2 in the order in which the devices constituting the intermediate unit 15 are arranged in the transport direction Y. In other words, in the recording system 10 shown in FIG. 1, the inversion device 30, the moistening device 40, and the drying device 50 constituting the intermediate unit 15 are arranged in this order. That is, after the medium M, which has been recorded on by the recording device 20 and has been transported, is inverted by the inversion device 30, the medium M after inversion is moistened by the moistening device 40.

On the other hand, in the recording system 10 shown in FIG. 2, the moistening device 40, the inversion device 30, and the drying device 50 constituting the intermediate unit 15 are arranged in this order. That is, the medium M after recording, which is carried in from the recording device 20, is moistened by the moistening device 40, and then is inverted by the inversion device 30.

As described above, in the recording system 10 of the present embodiment, the medium M on which recording has been performed by the recording device 20 is moistened by the moistening device 40, and then the moistened medium M is dried by the drying device 50. In the recording system 10 illustrated in FIG. 1, the moistening device 40 moistens the medium M on which recording has been performed by the recording device 20 and which has been inverted by the inversion device 30. In the recording system 10 shown in FIG. 2, the inversion device 30 inverts the medium M moistened by the moistening device 40. The recording system 10 according to the present embodiment performs post-processing by the post-processing device 60 on the medium M on which recording has been performed by the recording device 20 and which has been moistened by the moistening device 40.

The recording device 20 performs recording on a medium M. The recording device 20 is, for example, an inkjet printer that ejects liquid such as ink onto a medium M. In the inkjet printer, the medium M after recording to which a liquid such as ink is attached swells and extends in a process in which a medium fiber absorbs a solvent component (for example, water) in the ink, and the medium M contracts in a process in which moisture evaporates from the medium fiber in a subsequent drying process. Such a phenomenon is likely to occur on the surface side of the medium M to which a liquid such as ink is attached. Therefore, the medium M after recording is likely to curl due to swelling and contraction caused by liquid such as ink attached to the surface of the medium M. This type of curl is likely to occur due to, for example, the fact that the recording portion of the medium M is biased to one of the first surface and the second surface and the liquid such as ink attached to the medium M is distributed in a specific part of the entire surface of the medium M. Therefore, the curl of the medium M is suppressed by suppressing the distribution of the moisture in the medium M after recording, that is, the deviation of the moisture percentage. For this reason, the recording system 10 of the first embodiment has a decurling function to suppress the curling of the medium M.

The recording system 10 illustrated in FIG. 1 includes the recording device 20, the inversion device 30, the moistening device 40, the drying device 50, and the post-processing device 60 in this order from the upstream side in the transport direction of the medium M.

The recording system 10 illustrated in FIG. 2 includes the recording device 20, the moistening device 40, the inversion device 30, the drying device 50, and the post-processing device 60 in this order from the upstream side in the transport direction of the medium M.

First, the recording device 20 will be described. The recording device 20 includes one or more cassettes 21, a first transport section 22, and a liquid ejection section 23. The recording device 20 may include a housing 24. In this case, the cassette 21, the first transport section 22, and the liquid ejection section 23 may be housed in the housing 24.

The cassette 21 accommodates the medium M. The cassette 21 can accommodate the medium M in a stacked state. The cassette 21 is removably inserted into the housing 24. A user can replenish the medium M in the cassette 21 or replace the medium M by pulling out the cassette 21 from the housing 24. The recording device 20 may include a medium placement section on which the medium M to be fed can be placed, in addition to the cassette 21 or instead of the cassette 21. The medium placement section may be a feed tray provided on a side surface of the housing 24. FIGS. 1 and 2 show an example in which the medium M transported along the transport path T in the recording system 10 is fed from a medium placement section (not illustrated) in the recording device 20.

The first transport section 22 transports the medium M from the cassette 21 along the transport path T1. The first transport section 22 includes a feed section (not illustrated) that feeds the medium M one by one from the cassette 21. The first transport section 22 transports the fed medium M along the transport path T1.

The liquid ejection section 23 performs recording on the medium M. The liquid ejection section 23 is disposed at a position facing the transport path T1. The liquid ejection section 23 performs recording on the medium M transported along the transport path T1. The liquid ejection section 23 may be, for example, a liquid ejection head that ejects liquid such as ink. The liquid ejection head may be, for example, an inkjet head. In this case, the liquid ejection section 23 ejects liquid such as ink from a nozzle toward the medium M to record a character or an image on the medium M.

The transport path T1 may include a discharge path T11, an inversion path T12, and a discharge path T13. The discharge path T11 is a path for discharging the medium M after recording to a downstream device. The discharge path T11 is a path for discharging the medium M after recording from a discharge port (not illustrated) that opens on a side surface of the housing 24. The first transport section 22 includes a discharge roller pair 26 that discharges the medium M at a position near the discharge port of the discharge path T11. The inversion path T12 is a path for inverting the medium M recorded on the first surface in a direction in which recording can be performed on the second surface. The inversion path T12 is a path for sending the inverted medium M to the recording position of the liquid ejection section 23 in a direction in which the second surface faces the liquid ejection section 23. Here, for example, the first surface is a front surface of the medium M, and the second surface is a back surface of the medium M. The discharge path T13 is a path through which the medium M after recording is discharged to a discharge stacker 25.

The inversion device 30 includes an inversion section 31. The inversion section 31 has a function of inverting the medium M. The inversion device 30 includes a second transport section 32 that transports the medium M along the transport path T2. The inversion device 30 may include a housing 33 that houses the inversion section 31 and the second transport section 32. The housing 33 includes a carry-in port (not illustrated) through which the medium M is carried in and a discharge port (not illustrated) through which the medium M is discharged. The transport path T2 may include an inversion path T21 in which the medium M is inverted and a transport path T22 in which the medium M is transported without being inverted and with the front and back sides of the medium M facing the same direction. The inversion path T21 is, for example, a switchback path. The inversion section 31 includes a transport roller 34 and a flap 35. The transport roller 34 carried in and out the medium M along the inversion path T21. The flap 35 selects a carry-in path and a discharge path of the medium M along the transport path T2. By this, the inversion section 31 inverts the medium M by transporting the medium M along the switchback path. The transport path T22 is, for example, a path extending horizontally from a carry-in port to a discharge port. The transport path T22 is a path along which the medium M carried in from a carry-in port of the housing 33 is transported in a horizontal posture and is discharged from a discharge port on the downstream side. In the inversion device 30, whether or not to invert the medium M may be selected according to the content of the post-processing of the post-processing device 60.

The moistening device 40 moistens the medium M by spraying the moistening liquid HL onto the medium M. The moistening device 40 includes a third transport section 41 as an example of a transport section and a spray section 42. The third transport section 41 transports the medium M along the transport direction Y1. The spray section 42 sprays the moistening liquid HL on the medium M transported by the third transport section 41. The spray section 42 may be provided as one or more (for example, two). The moistening device 40 may include a housing 43 that houses the third transport section 41 and the spray section 42. The third transport section 41 transports the medium M carried in from the inlet of the housing 43 along the transport path T3. The third transport section 41 includes two transport roller pairs 44 that transport the medium M along the transport path T3. The spray section 42 moistens the medium M by spraying the moistening liquid HL toward the medium M transported along the transport path T3.

In the present embodiment, a pair of spray sections 42 are arranged on both sides of the transport path T3. One (upper side) of the spray sections 42 sprays the moistening liquid HL toward the first surface Ma of the medium M. The other (lower) spray section 42 sprays the moistening liquid HL toward a second surface Mb which is a surface on the opposite side to the first surface Ma of the medium M. The medium M is transported in a horizontal transport direction Y1. The pair of spray sections 42 are arranged at positions on both sides of the transport path T2 in the vertical direction Z so as to face each other.

Specifically, the moistening device 40 includes a first moistening unit 40A and a second moistening unit 40B. The first moistening unit 40A sprays the moistening liquid HL onto the first surface Ma (see FIG. 3) of the medium M. The second moistening unit 40B sprays the moistening liquid HL onto a second surface Mb (see FIG. 3) opposite to the first surface Ma of the medium M. The first moistening unit 40A includes the spray section 42 that sprays the moistening liquid HL onto the first surface Ma of the medium M. The second moistening unit 40B includes the spray section 42 that sprays the moistening liquid HL onto the second surface Mb of the medium M.

The drying device 50 includes a fourth transport section 51 and a heating section 52. The fourth transport section 51 includes one or more (for example, two) transport roller pairs 53 that transports the medium M along the transport path T4. The heating section 52 heats the medium M. The heating section 52 includes, for example, one or more heating rollers 54. The example of the drying device 50 illustrated in FIGS. 1 and 2 is configured to heat both surfaces of the medium M by a pair of heating rollers 54 heated to a predetermined heating temperature rotating in a state of sandwiching the medium M. The medium M is dried by being heated by the heating rollers 54. The drying device 50 may include a housing 55 that houses the fourth transport section 51 and the heating section 52.

The post-processing device 60 includes one or more (for example, two) post-processing sections 61. The post-processing device 60 includes a fifth transport section 62 that transports the medium M. The post-processing device 60 may include a housing 63 that houses the post-processing section 61 and the fifth transport section 62. The fifth transport section 62 transports the medium M carried in from the inlet of the housing 63 along the transport path T5. The fifth transport section 62 includes one or more transport roller pairs 64 that transport the medium M along the transport path T5, and a flap 65 that selects the path of the medium M at a branching point in the way of the transport path T5. The post-processing section 61 includes a tray 66, a post-processing mechanism 67, and a discharge roller 68. The tray 66 receives the medium M carried in. The post-processing mechanism 67 performs post-processing on the medium M placed on the tray 66. The discharge roller 68 discharges the medium M on which the post-processing is performed by the post-processing mechanism 67. The post-processing device 60 includes one or more (for example, three) discharge trays 69 on which the discharged medium M is stacked. The discharge tray 69 may partially include a tray on which the medium M discharged without being subjected to the post-processing is stacked.

Here, the post-processing includes post-processing performed on one medium M and post-processing performed on the plurality of medium M. Examples of the post-processing performed on one medium M include processing of forming a fold and processing of forming a perforation. Examples of the post-processing performed on the plurality of medium M include saddle stitching processing in which the plurality of medium M are discharged in a state of being stitched and folded, and stapling processing in which the plurality of medium M are fastened with a staple. The post-processing performed on the plurality of medium M may be processing of aligning the medium M by a predetermined number of sheets or processing of discharging the medium M in a state of being slightly shifted in the width direction X by a predetermined number of sheets. The post-processing may be punch process for forming a hole in the medium M. A transport section 12 of the recording system 10 includes the first transport section 22, the second transport section 32, the third transport section 41, the fourth transport section 51, and the fifth transport section 62 provided in each of the devices 20, 30, 40, 50, and 60 constituting the recording system 10.

First Example

Hereinafter, a detailed configuration of the moistening device 40 will be described. First, the moistening device 40 of the first example will be described with reference to FIGS. 3 to 5.

Configuration of the First Example

Figure 3:
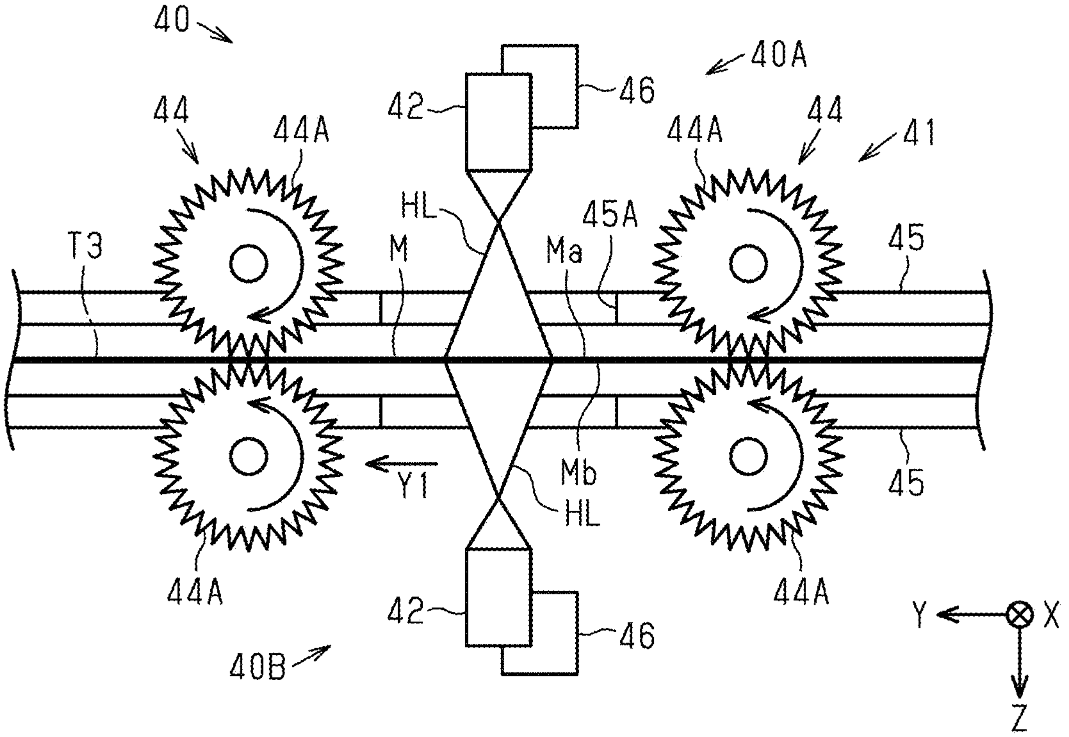
FIG. 3 is a schematic front view of the moistening device.

As shown in FIG. 3, the third transport section 41 (hereinafter, also simply referred to as "transport section 41") includes a transport roller pair 44 and a guide plate 45 for guiding a medium M along the transport path T3. The transport roller pair 44 is constituted of a pair of serrated rollers 44A having a plurality of tooth sections with pointed tips along the outer periphery. The spray section 42 is, for example, a nozzle. The pair of spray sections 42 are respectively arranged at two positions opposed to each other across the transport path T3. The guide plate 45 has an exposing opening 45A that exposes a portion of the medium M corresponding to the spray target area where the spray section 42 sprays the moistening liquid. The transport roller pair 44 transports the medium M in the transport direction Y1 by rotating in the rotation direction indicated by an arrow in FIG. 3. The spray section 42 can spray the moistening liquid to a region between two transport roller pairs 44 disposed at two different positions in the transport direction Y1. The transport roller pair 44 may be constituted by a pair of ceramic rollers in which the ceramic powder impregnated in the surface layer of the outer periphery of the roller is exposed.

Figure 4:
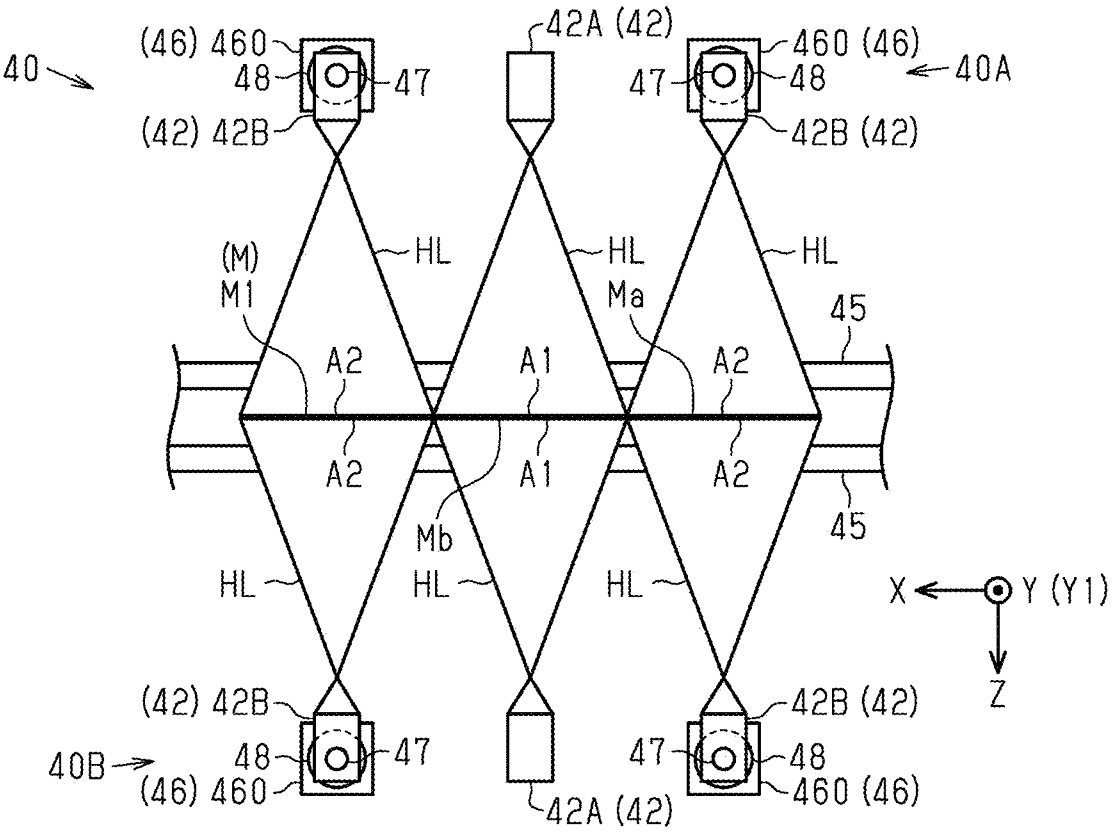
FIG. 4 is a schematic side view showing the moistening device of the first example.

As shown in FIG. 4, the moistening device 40 includes one or more spray sections 42 in the width direction X. In the example shown in FIGS. 4 and 5, the moistening device 40 includes the plurality of spray sections 42. The moistening device 40 includes a movement section 46 for moving the spray section 42. The movement section 46 of the present example pivots the spray section 42 about a pivoting shaft 47 along the transport direction Y1. That is, the movement section 46 of the present example is a pivoting mechanism 460 which pivots the spray section 42 about the pivoting shaft 47 along the transport direction Y1. The pivoting mechanism 460 includes the pivoting shaft 47 and a motor 48 which is a drive source of the pivoting shaft 47. The pivoting shaft 47 is coupled to an output shaft of the motor 48 in a power transmittable state directly or via a decelerator (not illustrated).

In the example including the plurality of spray sections 42 shown in FIG. 4, the spray sections 42 include a first spray section 42A and a second spray section 42B. The first spray section 42A sprays the moistening liquid HL to the center region A1 of the medium M in the width direction X intersecting the transport direction Y1. The second spray section 42B sprays the moistening liquid HL to a region different from the center region A1 in the width direction X. In the example illustrated in FIG. 4, the spray section 42 sprays the moistening liquid to the edge regions A2 on both sides sandwiching the center region A1 of the medium M in the width direction X. The movement section 46 pivots the second spray section 42B about the pivoting shaft 47.

Specifically, the spray section 42 includes one fixed first spray section 42A and two pivotable type second spray sections 42B. The fixed first spray section 42A is arranged at a position facing the center region A1 of the medium M in the width direction X. The pivotable type second spray sections 42B are arranged at a position facing the edge regions A2 of the medium M in the width direction X.

The first moistening unit 40A and the second moistening unit 40B respectively include the first spray section 42A and the second spray section 42B. The first spray section 42A and the second spray section 42B constituting the first moistening unit 40A, and the first spray section 42A and the second spray section 42B constituting the second moistening unit 40B, are arranged at positions facing each other across the transport path T3. The first moistening unit 40A and the second moistening unit 40B may be arranged at different positions in the transport direction Y1. In the following description, the first moistening unit 40A and the second moistening unit 40B are not distinguished from each other unless otherwise specified.

Action of the First Example

Figure 5:
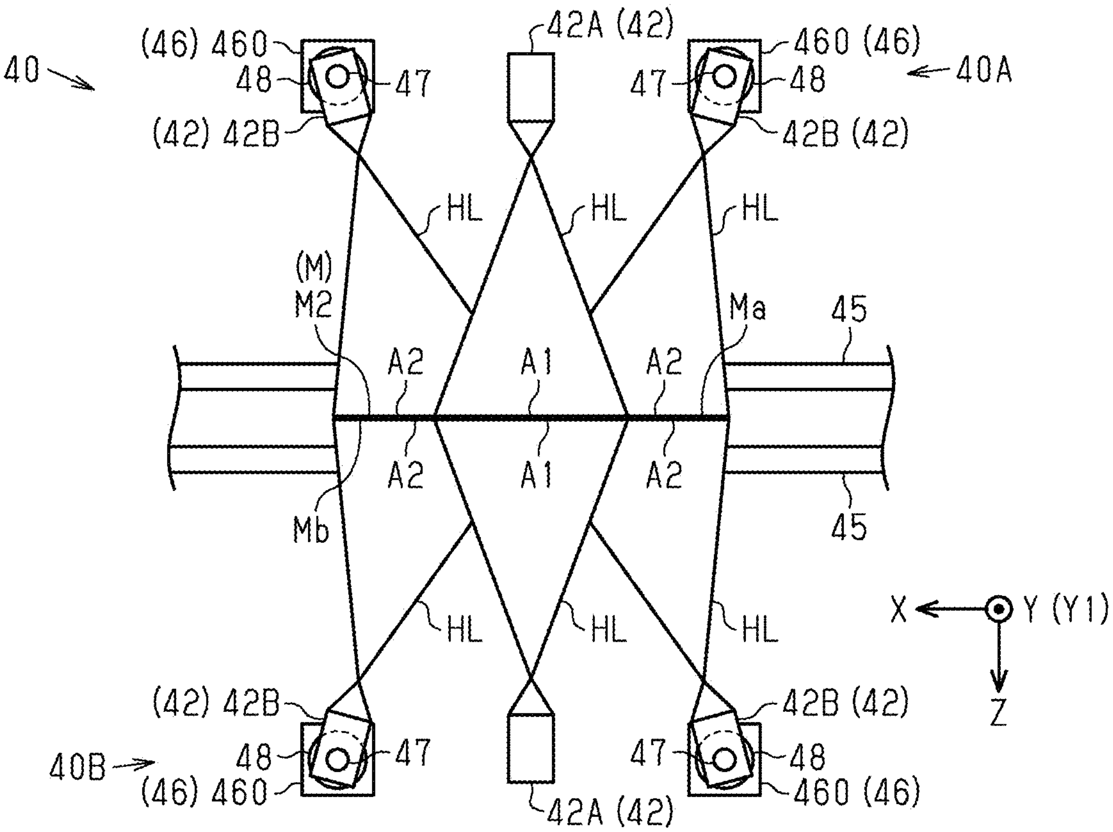
FIG. 5 is a schematic side view of the moistening device.

As shown in FIG. 4, when the width size of the medium M is the large first size, the two second spray sections 42B are arranged in a pivoting posture oriented in the first direction. Two second spray sections 42B spray the moistening liquid toward the medium M in the first direction. As shown in FIG. 5, when the width size of the medium M is a second size which is smaller than the first size, the two second spray sections 42B are arranged in a pivoting posture which is oriented in a second direction which is a direction closer to the center region A1 than the first direction. Two second spray sections 42B spray the moistening liquid toward the medium M in the second direction.

By moving the spray section, it is possible to optimize moistening, such as being able to cope with various medium sizes without increasing the number of spray sections, and being able to equalize the moistening amount on the entire surface of the medium M. Increasing the number of spray sections in accordance with the maximum medium width leads to an increase in manufacturing cost and power consumption. Since it is not necessary to increase the number of spray section 42, manufacturing cost and power consumption can be reduced.

Since the center region A1 is a region that is moistened regardless of the width size of the medium M, the first spray section 42A does not pivot. By pivoting the second spray section 42B positioned on the end section side, the entire medium M with various width sizes can be moistened solely by the pivotal movement of the two spray sections 42B.

Second Example

Next, a second example of the moistening device 40 will be described with reference to FIGS. 6 and 7. The second example differs from the first example in the configuration of the movement section 46. Except for the configuration of movement section 46, the second embodiment has the same configuration as the first example. Therefore, the configuration of movement section 46 according to the present example will be mainly described below.

Configuration of the Second Example

Figure 6:
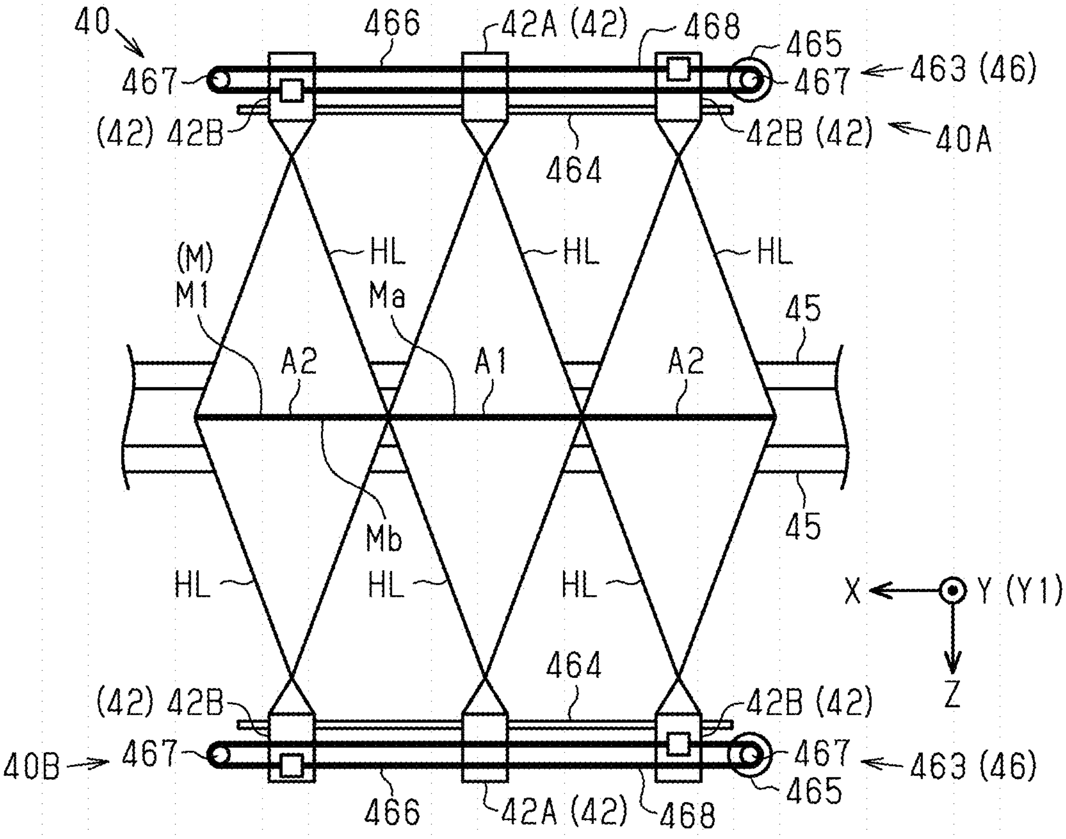
FIG. 6 is a schematic side view showing the moistening device of the second example.
Figure 7:
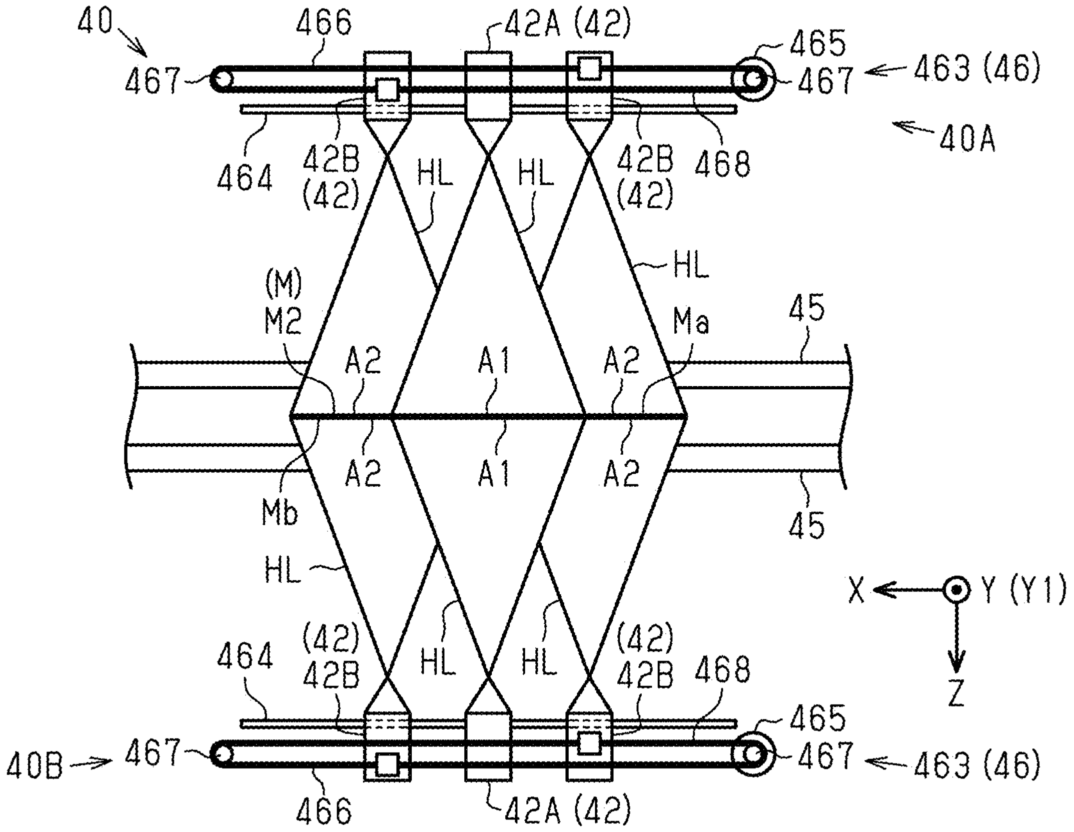
FIG. 7 is a schematic side view of the moistening device.

As shown in FIGS. 6 and 7, the movement section 46 of the second example moves the spray section 42 in the width direction X intersecting the transport direction Y1. One or more spray sections 42 are provided. When there is the plurality of spray sections 42, the plurality of spray sections 42 may include the first spray section 42A and the second spray A1 of the medium M in the width direction X. The second spray section 42B sprays the moistening liquid HL to a region different from the center region A1 in the width direction X. In the example illustrated in FIG. 6, the spray section 42 sprays the moistening liquid HL to the edge regions A2 on both sides sandwiching the center region A1 of the medium M in the width direction X.

Specifically, the spray section 42 consists of one fixed first spray section 42A and two movable second spray sections 42B. The fixed first spray section 42A is arranged at a position facing the center region A1 of the medium M in the width direction X. The movable second spray section 42B is arranged at a position facing the edge region A2 of the medium M in the width direction X.

The movement section 46 moves the second spray section 42B in the width direction X intersecting the transport direction Y1. That is, the movement section 46 is a moving mechanism 463 that moves the second spray section 42B in the width direction X. The moving mechanism 463 includes a guide rail 464, a motor 465, and a power transmission mechanism 466. The guide rail 464 guides the second spray section 42B movably in the width direction X. The motor 465 is a drive source that moves the second spray section 42B in the width direction X along the guide rail 464. The power transmission mechanism 466 transmits the driving force of the motor 465 to the second spray section 42B as power for moving the second spray section 42B. The power transmission mechanism 466 may be, for example, a belt-type power transmission mechanism. The power transmission mechanism 466, which is a belt-type power transmission mechanism, includes a pair of pulleys 467 and an endless timing belt 468. One (the right side in FIG. 6) of the pair of pulleys 467 is coupled to an output shaft of the motor 465. The timing belt 468 has two belt sections extending in parallel in the width direction X. One of the two second spray sections 42B is fixed to one belt section, and the other second spray section 42B is fixed to the other belt section. Therefore, when the motor 465 is forwardly driven, the two second spray sections 42B move in a direction away from each other in the width direction X. When the motor 465 is reversely driven, the two second spray sections 42B move in a direction approaching each other in the width direction X. The power transmission mechanism 466 is not limited to a belt-type power transmission mechanism, and may be any mechanism capable of converting rotation into linear motion in the width direction X. The power transmission mechanism 466 may be a ball screw mechanism and the like.

Action of the Second Example

As shown in FIG. 6, when the medium is a large medium M1 with a large width size, the two second spray sections 42B are arranged at positions relatively widely spaced apart from each other in the width direction X. Three spray sections 42 spray the moistening liquid HL toward the large medium M1. For example, the moistening liquid HL sprayed from the three spray sections 42 at a predetermined spread angle may be sprayed so as not to overlap each other on the medium M1.

Further, as shown in FIG. 7, when the medium is the small medium M2 having a small width size, the two second spray sections 42B are arranged at positions relatively narrowly spaced apart from each other in the width direction X. Three spray sections 42 spray the moistening liquid HL toward the small medium M2. In the example illustrated in FIG. 7, since the spread angle of the spray section 42 is substantially constant, the moistening liquid HL from each spray section 42 overlaps on the small medium M2 in the case of the small medium M2. In general, in the case of a spray nozzle or the like, the spread angle tends to decrease as the injection pressure decreases. Therefore, the overlap of the moistening liquid HL between the spray sections 42 may be adjusted to be small by adjusting the spray pressure of the spray section 42 to be smaller for the small medium M2 than for the large-sized medium M2.

Since the center region A1 is a region to be moistened regardless of the width size of the medium M, the first spray section 42A does not move. Since the second spray section 42B positioned on the end section side moves in the width direction X, the entire medium M having various width sizes can be moistened only by the movement of the two spray sections 42B.

Third Example

Next, a third example of the moistening device 40 will be described with reference to FIGS. 8 and 9. The third example is different from the above examples in the configuration of the movement section 46. The configurations other than the configuration of the movement section 46 are the same as those of the respective examples. Therefore, the configuration of movement section 46 according to the present example will be mainly described below.

The moistening device 40 moistens the medium M on which recording has been performed by the liquid ejection section 23 (see FIGS. 1 and 2). The moistening device 40 may include one or more spray sections 42. When there is the plurality of spray sections 42, the plurality of spray sections 42 includes the first spray section 42A and the second spray section 42B. The first spray section 42A sprays the moistening liquid HL to the center region A1 of the medium M in the width direction X. The second spray section 42B sprays the moistening liquid HL to a region different from the center region A1 in the width direction X. In the example shown in FIG. 8, the second spray section 42B sprays the moistening liquid HL to the edge regions A2 which are regions on both sides in the width direction X with respect to the center region A1 in the width direction X. In the first moistening unit 40A of the present example, the first spray section 42A is further separated from the medium M than the second spray section 42B. For example, the spray section 42 is movable in a direction intersecting the medium M. Therefore, the first spray section 42A can be separated from the medium M more than the second spray section 42B like the first moistening unit 40A, and conversely, it can be closer to the medium M than the second spray section 42B like the second moistening unit 40B.

Figure 9:
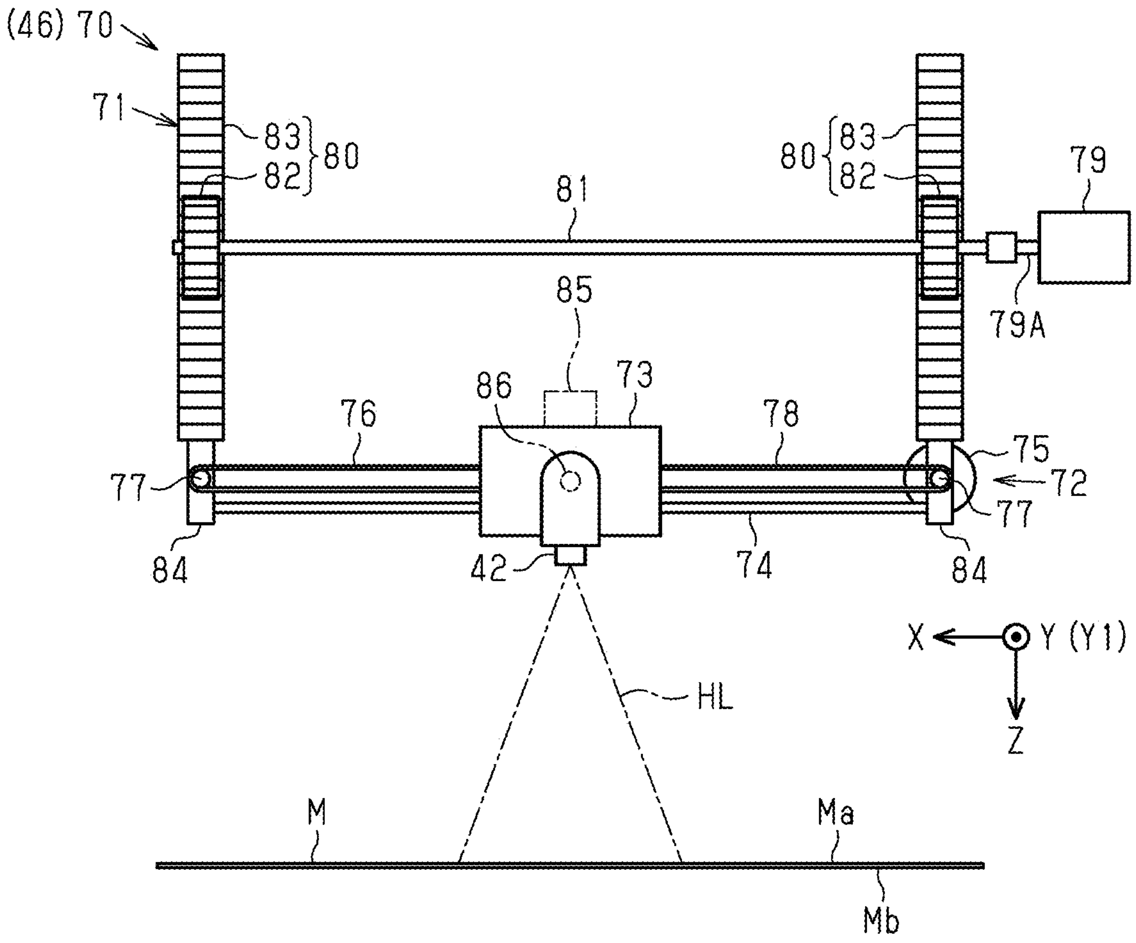
FIG. 9 is a schematic side view showing the movement section of the moistening device according to the third example.

Therefore, as illustrated in FIG. 9, the moistening device 40 according to the present example includes a movement section 46 that moves the spray section 42 in a direction intersecting the medium M. The movement section 46 is a moving mechanism 70 configured to move the spray section 42 in the vertical direction Z, which is a direction intersecting the medium M.

As shown in FIG. 9, the movement section 46 of the present example is the moving mechanism 70 movably configured the second spray section 42B in a direction intersecting the transport direction Y1 of the medium M (the width direction X) in addition to the direction intersecting the medium M (the vertical direction Z). Hereinafter, a detailed configuration of the moving mechanism 70 will be described.

As shown in FIG. 9, the moving mechanism 70 includes an elevating mechanism 71 and a horizontal movement mechanism 72. The elevating mechanism 71 is a mechanism that moves the spray section 42 in a direction intersecting the medium M. The horizontal movement mechanism 72 is a mechanism that moves the spray section 42 in the width direction X that intersects the transport direction Y1 of the medium M.

First, the horizontal movement mechanism 72 includes a carriage 73, a guide rail 74, a motor 75 serving as a drive source, and a power transmission mechanism 76. A spray section 42 is attached to the carriage 73. The spray section 42 is provided in the carriage 73 in a direction in which the moistening liquid HL can be sprayed toward the medium M. The guide rail 74 movably guides the carriage 73 in the width direction X. The motor 75 is a drive source for moving the carriage 73. The power transmission mechanism 76 is a mechanism that transmits the driving force of the motor 75 to the carriage 73. The power transmission mechanism 76 converts the rotation of the motor 75 into linear motion of the carriage 73. In the example shown in FIG. 9, the power transmission mechanism 76 is, for example, a belt-type power transmission mechanism. The power transmission mechanism 76, which is a belt-type power transmission mechanism, includes a pair of pulleys 77 and an endless timing belt 78. The timing belt 78 is wound around a pair of pulleys 77. The carriage 73 is fixed to a part of the timing belt 78. One (the right side in FIG. 9) of the pair of pulleys 77 is coupled to an output shaft of the motor 75. When the motor 75 is driven to rotate forward and backward, the carriage 73 reciprocates in the width direction X by power transmitted via the power transmission mechanism 76.

The elevating mechanism 71 shown in FIG. 9 is a mechanism for moving (raising and lowering) the horizontal movement mechanism 72 in the vertical direction Z. The elevating mechanism 71 includes a motor 79 as a drive source and a pair of rack-and-pinion mechanisms 80. The rack-and-pinion mechanism 80 includes a pinion 82 fixed to a rotation shaft 81 coupled to an output shaft 79A of the motor 79, and a rack 83 that meshes with the pinion 82. The pair of rack-and-pinion mechanisms 80 are arranged at two positions spaced apart from each other in the width direction X. The rack 83 is configured to move up and down when the pair of pinions 82 are driven forward and backward by the motor 79 that is driven to rotate forward and backward.

A support section 84 extends downward from lower end portions of the pair of racks 83. A pair of pulleys 77 and the motor 75 constituting the horizontal movement mechanism 72 are supported by the pair of support sections 84. By this, when the motor 75 is forwardly driven, the horizontal movement mechanism 72 is raised via the raising of the rack 83. By this, the carriage 73 and the spray section 42 are raised. Due to this rise, the spray section 42 moves away from the medium M. On the other hand, when the motor 75 is reversely driven, the horizontal movement mechanism 72 is lowered via the lowering of the rack 83. By this, the carriage 73 and the spray section 42 are lowered. By this, the spray section 42 approaches the medium M. By this, the spray section 42 can move in two directions of the width direction X and the vertical direction Z.

As shown in FIG. 9, a motor 85 indicated by a two-dot chain line in FIG. 9 may be provided in the carriage 73 as a drive source for pivoting the spray section 42. The spray section 42 may be configured to pivot around a pivoting shaft 86 indicated by a two-dot chain line in the drawing along the transport direction Y1 by the driving force of the motor 85. That is, in addition to the movement (raising and lowering) in the vertical direction Z and the movement in the width direction X, the spray section 42 may be configured to be pivotable so as to change the direction in which the moistening liquid HL is sprayed. By removing the horizontal movement mechanism 72 from the moving mechanism 70 shown in FIG. 9, the movement section 46 may include the elevating mechanism 71 that raising and lowering the spray section 42, and a pivoting mechanism that can change the spray direction by pivoting the spray section 42 around the pivoting shaft 86.

Action of the Third Example

The medium M on which recording is performed by the liquid ejection section 23 is also moistened by moisture in liquid such as ink. In general, the printing amount tends to increase toward the center in the width direction X of the medium M, and the printing amount tends to decrease toward the end section. Therefore, the first spray section 42A at the central section is separated from the medium M, and the second spray section 42B at the end section is brought close to the medium M. By this, it is possible to relatively decrease the moistening amount of the central section of the medium M and to relatively increase the moistening amount of the end section of the medium M. By this, uneven moistening of the medium M in the width direction X is suppressed.

When the first spray section 42A in the central section is moved away from the medium M, the moistening amount in the central section of the medium M can be relatively reduced. However, in consideration of the total moistening amount of both the front and back surfaces of the medium M, it may be preferable that the total moistening amounts of both the front and back surfaces are balanced between the center regions A1 and between the edge regions A2. Therefore, in the second moistening unit 40B on the lower side shown in FIG. 9, contrary to the first moistening unit 40A on the upper side, the first spray section 42A at the central section may be moved closer to the medium M, and the second spray section 42B at the end section may be moved away from the medium M.

Fourth Example

Next, a fourth example of the moistening device 40 will be described with reference to FIGS. 10 and 11. The fourth example is characterized by the control using the movement section 46. The configuration of the movement section 46 may be the same as that of any of the above-described examples. Hereinafter, the movement section 46 is assumed to be the same as that of the second example as an example. In the fourth example, a control section 100 controls the positions of the plurality of spray sections 42 so that the moistening liquid HL sprayed from the plurality of spray sections 42 uniformly adheres to the medium M.

The control section 100 controls the position of the spray section 42, and thus the moistening amount on the entire surface of the medium M is uniformized. By this, the moistening is optimized. The moistening device 40 according to the fourth example shown in FIG. 10 includes the plurality of spray sections 42. The plurality of spray sections 42 includes the first spray section 42A and the second spray section 42B.

Figure 10:
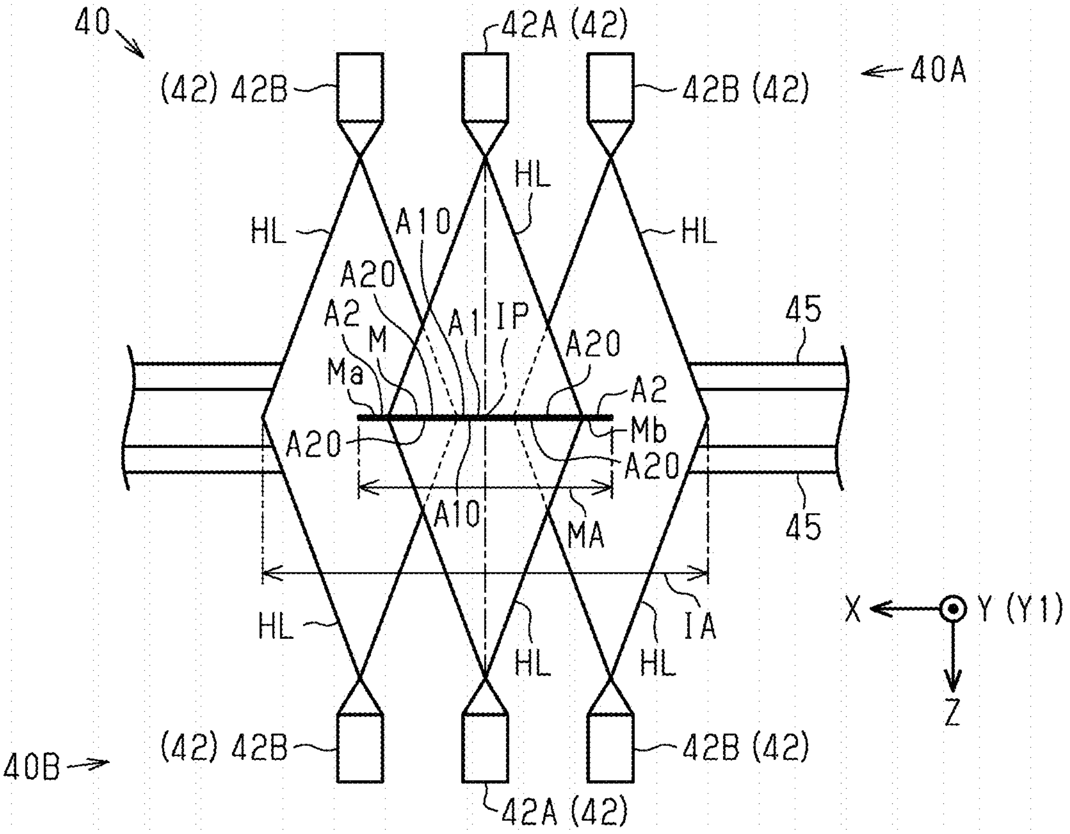
FIG. 10 is a schematic side view showing the moistening device of the fourth example.

As shown in FIG. 10, the first spray section 42A sprays the moistening liquid HL to the center region A1 of the medium M. The second spray section 42B sprays the moistening liquid HL to the edge region A2 of the medium M. The center region A1 where the first spray section 42A sprays the moistening liquid HL and the edge region A2 where the second spray section 42B sprays the moistening liquid HL overlap each other. A region in which the moistening liquid HL is sprayed only by the first spray section 42A is referred to as a first region A10. The overlapping region in which the moistening liquid HL is sprayed by the first spray section 42A and the second spray section 42B is referred to as a second region A20. The movement section 46 moves at least one of the first spray section 42A and the second spray section 42B. The control section 100 controls to positions the movement section 46 such that the moistening amount of the first region A10, where the moistening liquid HL is sprayed only by the first spray section 42A, and the moistening amount of the second region A20, where the moistening liquid HL is sprayed by both the first spray section 42A and the second spray section 42B, are equal to each other. By this, the movement section 46 moves the spray section 42 so that the moistening amount is equal in the entire width direction X intersecting the transport direction Y1. Here, "to be equal" does not necessarily mean only that the actual moistening amounts are equal. The moistening amounts of the first region A10 and the second region A20 may be controlled so as to approach each other.

As shown in FIG. 10, the spray section 42 sprays the moistening liquid HL so as to spread at a predetermined spread angle. Therefore, the density of the moistening liquid HL becomes higher toward the center of the diffusion region sprayed in a substantially conical shape, and the density of the moistening liquid HL becomes lower toward the peripheral edge section. For this reason, in a case where the center region A1 and the edge region A2, which are the respective spraying regions of the plurality of spray sections 42A and 42B, do not overlap each other, the density of the moistening liquid HL decreases toward the peripheral edge side of each region A1 and A2. By this, the distribution of the moistening amount is generated on the entire surface of the medium M. Therefore, in the present example, by overlapping the center region A1 and the edge region A2, the moistening amount of the overlapped portion is increased. By this, the uneven distribution of the moistening amount is reduced.

The control section 100 controls the movement section 46 (for example, refer to FIG. 7) to move at least one of the first spray section 42A and the second spray section 42B such that the moistening amount of the first region A10 and the moistening amount of the second region A20 are equal to each other. In the example shown in FIG. 10, when the first spray section 42A is a fixed type and the second spray section 42B is a movable type, the control section 100 controls the movement section 46 to move the second spray section 42B so that the moistening amount of the first region A10 and the moistening amount of the second region A20 become equal to each other.

In FIG. 10, the entire region in which the medium M is present in the width direction X is referred to as a medium region MA, and the entire region in which the three spray sections 42 spray the moistening liquid HL on the medium M is referred to as a spraying region IA. An intersection point between the axial line of the first spray section 42A and the medium M, in other words, the center of the first region A10 (or the center region A1) is set as the spray position IP. A position in the spraying region IA in the width direction X is indicated by a distance from the spray position IP.

Figure 11:
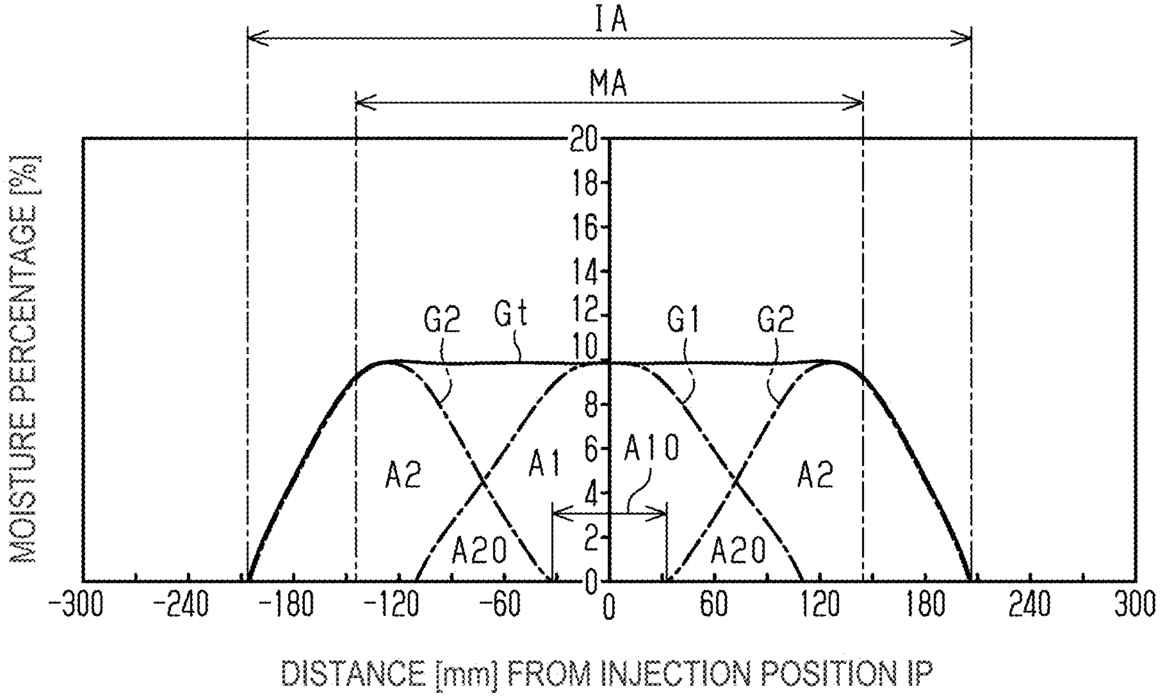
FIG. 11 is a graph showing the moisture percentage in the width direction of the medium on which the liquid is sprayed.

FIG. 11 is a graph showing the moisture percentage of the medium M moistened by the moistening device 40 shown in FIG. 10. In this graph, the horizontal axis represents the distance [mm] from the spray position IP, and the vertical axis represents the moisture percentage [%]. For sake of simplicity, the graph shows a case where the moisture percentage of the medium M before moistening is uniform over the entire medium M. However, the moisture percentage of the medium M before moistening may be considered. A graph line G1 indicates the moisture percentage in the center region A1 sprayed with the moistening liquid HL by the first spray section 42A. Two graph lines G2 indicate the moisture percentages in the two edge regions A2 to which the two second spray sections 42B have sprayed the moistening liquid HL.

The graph line Gt indicates the total moisture percentages of the graph lines G1 and G2 with respect to the positions indicated by the distances from the spray position IP. As can be seen from the graph line Gt, the moisture percentage of the moistening liquid HL sprayed onto the medium M by the spray sections 42A and 42B is uniform over the entire surface of the medium. The control section 100 controls the position of the second spray section 42B via the movement section 46 based on the moisture percentages of the respective regions determined from the spray characteristics of the first spray section 42A and the second spray section 42B so that the total moisture percentage is uniform regardless of the position in the width direction X.

Action of the Fourth Example

The sprayed moistening liquid HL diffuses in a conical shape. Therefore, the moisture percentage of the medium M tends to decrease as the distance from the spray position IP, which is the center of the spray range, in the width direction X increases. By arranging the second region A20 which is located at the edge section of the center region A1 and has a relatively small moistening amount and the edge section of the edge region A2 to overlap, the second region A20 is moistened by the two spray sections 42A and 42B. By this, the moistening amount of the second region A20 is increased. The movement section 46 moves the second spray section 42B in the width direction X to adjust the interval between the first spray section 42A and the second spray section 42B in the width direction X, thereby adjusting the moistening amount of the second region A20 to be the same as the moistening amount of the first region A10 only by the first spray section 42A. By this, it is possible to suppress the unevenness of the moistening amount in the width direction X. The movement section 46 may be of a pivotable type according to the first example (see FIG. 5), a parallel movement type according to the third example (see FIG. 7), or a type including a parallel movement type and an up and down type according (see FIG. 9) to the fourth example. At least one of the first spray section 42A and the second spray section 42B may move. For example, the first spray section 42A may be of a movable type, and the second spray section 42B may be of a fixed type.

Electrical Configuration of Recording System 10

Figure 12:
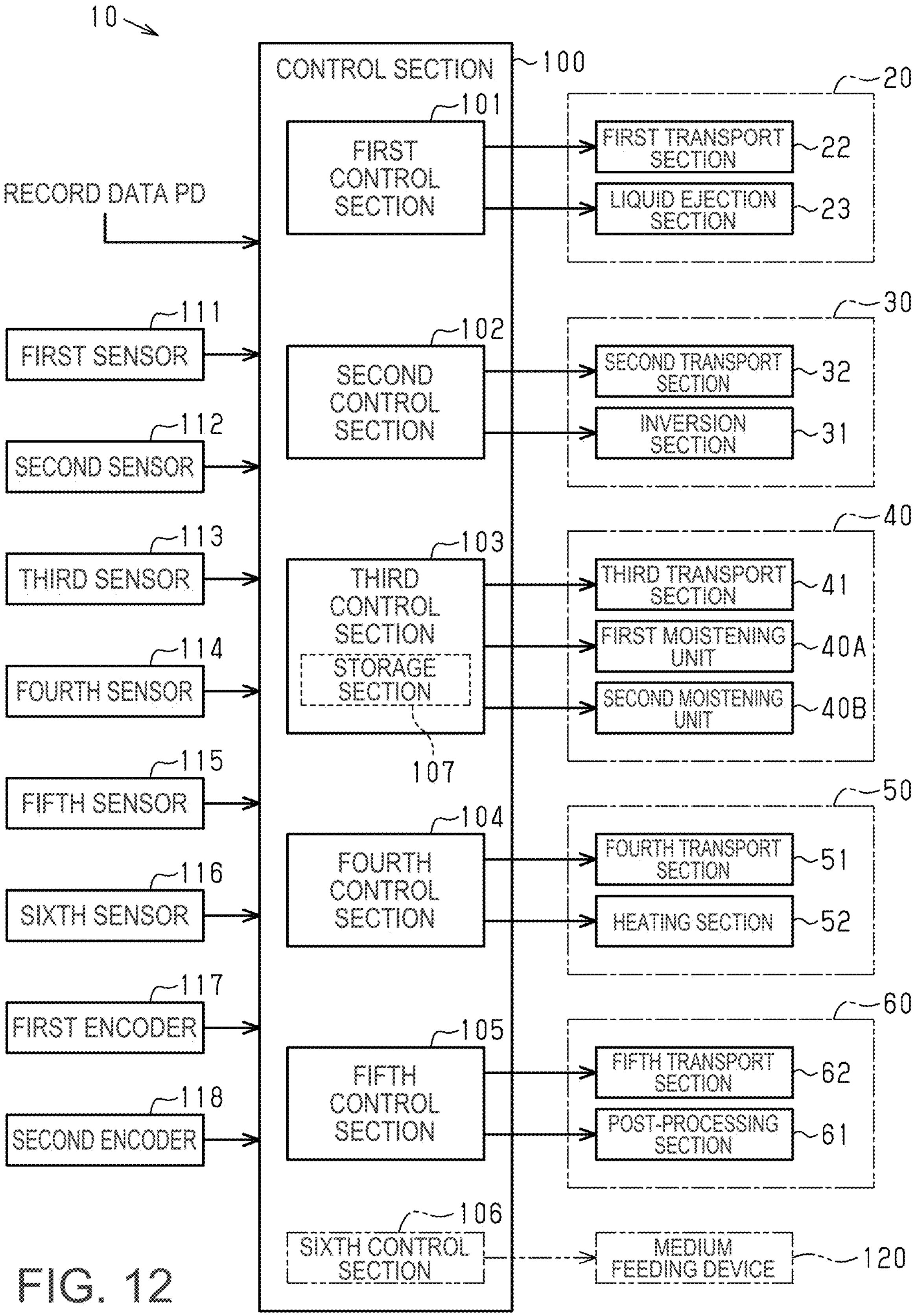
FIG. 12 is a block diagram showing the electrical configuration of the recording system.

Next, an electrical configuration of the recording system 10 will be described with reference to FIG. 12. As shown in FIG. 12, the recording system 10 includes the control section 100 that performs overall control of the recording system 10. In the present embodiment, the control section 100 includes a first control section 101, a second control section 102, a third control section 103, a fourth control section 104, and a fifth control section 105 that individually control the devices 20, 30, 40, 50, and 60, respectively. The first control section 101 may be provided in the recording device 20, and the fifth control section 105 may be provided in the post-processing device 60. In this case, the control sections 102 to 104 may be provided in the corresponding devices 30, 40, and 50, or may be provided in the recording device 20 or the post-processing device 60.

The first control section 101 performs recording on the medium M by controlling the first transport section 22 and the liquid ejection section 23, which constitute the recording device 20.

The second control section 102 inverts the medium M by controlling the second transport section 32 and the inversion section 31, which constitute the inversion device 30.

The third control section 103 moistens the medium M by controlling the third transport section 41, the first moistening unit 40A, and the second moistening unit 40B that constitute the moistening device 40. Specifically, the third control section 103 moistens the first surface Ma of the medium M by controlling the spray section 42 and the movement section 46 constituting the first moistening unit 40A. The third control section 103 moistens the second surface Mb of the medium M by controlling the spray section 42 and the movement section 46 constituting the second moistening unit 40B.

The fourth control section 104 dries the medium M by heating by controlling the fourth transport section 51 and the heating section 52, which configure the drying device 50.

The fifth control section 105 performs post-processing on the medium M by controlling the fifth transport section 62 and the post-processing section 61, which constitute the post-processing device 60. The fifth control section 105 performs, for example, a saddle stitching processing or a stapling processing on the medium M as the post-processing by controlling the post-processing section 61.

The sensors 111 to 115 and the encoders 117 and 118 included in one or more of the devices 20, 30, 40, 50, and 60 are electrically connected to the control section 100. Further, record data PD is input to the control section 100 (specifically, the first control section 101) from a host device (not shown). The record data PD includes recording condition information and image data. The recording condition information includes information such as a type of the medium M (medium type), a medium size, a recording mode, and a recording color (color/monochrome). The image data is dot data including, for each pixel, a density value (pixel value) corresponding to an ejection amount of liquid such as ink ejected from a plurality of nozzles included in the liquid ejection section 23. The first control section 101 causes liquid droplets to be ejected from the nozzles by a ejection amount corresponding to the density value of each pixel (dot) of the image data. A character or an image is recorded on the medium M by a plurality of dots formed by landing the plurality of liquid droplets on the medium M. The image data in the record data PD is used to ascertain the amount of the liquid ejected onto the medium M.

The first sensor 111 detects the medium M transported along the transport path T at a position further upstream in the transport direction Y than the spray section 42 in the moistening device 40 in the recording system 10. The first sensor 111 may be provided in the recording device 20 or may be provided in the moistening device 40. When the first sensor 111 is provided inside the recording device 20, it detects the medium M at a predetermined position on the transport path T1 of the medium M inside the recording device 20. The control section 100 acquires the position of the medium M in the recording system 10 based on the position at which the first sensor 111 detects the medium M and the transport amount of the medium M starting from the position. When the position of the medium M acquired based on the detection result of the first sensor 111 enters a position facing the moisten region of the spray section 42, the control section 100 causes the spray section 42 to start spraying the moistening liquid HL.

A second sensor 112 is a width sensor that detects the width size of the medium M. The width size detected by the second sensor 112 is information with which the size of the medium M can be specified. The control section 100 can acquire size information of the medium M from the width size detected by the second sensor 112. The control section 100 specifies the width range to be sprayed by the spray section 42 based on the width size information detected by the second sensor 112. The control section 100 controls the movement section 46 so as to move the spray section 42 within a movement range in which spraying can be performed within the specified width range. In the recording system 10, the second sensor 112 detects the width size of the medium M at a position upstream of the spray section 42 in the moistening device 40 in the transport direction Y1. The second sensor 112 may be provided in the recording device 20 or in the moistening device 40.

A third sensor 113 detects at least one of the ambient temperature or the humidity of interior of the recording system 10 or the exterior of the housing of the recording system 10. The control section 100 acquires one of the temperature or the humidity based on the detection result of the third sensor 113. The control section 100 may acquire the moisture percentage of the medium M before recording based on at least one of the temperature or the humidity. When calculating the moistening amount sprayed by the spray section 42, the control section 100 may subtract the amount of water corresponding to the moisture percentage due to moisture or the like from the target moistening amount. In addition, the third sensor 113 may be a moisture percentage detection sensor which detects the moisture percentage of the medium M, instead of a configuration which acquires one of the temperature or the humidity. The third sensor 113 that includes a moisture percentage detection sensor, may detect the moisture percentage of the medium M before recording at a position upstream of the liquid ejection section 23 in the transport direction Y1, or may detect the moisture percentage of the medium M after recording at a position downstream of the liquid ejection section 23 in the transport direction Y1. In the latter case, the third sensor 113 can detect a moisture percentage including moisture in a liquid such as ink adhered to the medium M by recording. The third sensor 113 formed of the moisture percentage detection sensor may be arranged at three or more positions including the central section and both end sections in the width direction X of the medium M.

A fourth sensor 114 is a position sensor that detects the movement position of the spray section 42 moved by the movement section 46. In the moistening device 40 of the first example, the fourth sensor 114 may be an angle sensor for detecting a rotation angle of the spray section 42. In the moistening device 40 of the third example, the fourth sensor 114 may be a distance sensor that detects the distance between the spray section 42 and the medium M.

A fifth sensor 115 is a position sensor that detects the origin position on the movement path along which the second spray section 42B moves in the width direction X in the second example. The fifth sensor 115 detects the second spray section 42B at the origin position.

A first encoder 117 detects the rotation of the motor 465, which is a drive source for moving the second spray section 42B in the width direction X. When the control section 100 detects that the second spray section 42B is at the origin position from the fifth sensor 115, the control section 100 resets the first counter (not illustrated). The control section 100 increments the first counter each time it detects a pulse edge of an encoder signal, which is a pulse signal input from the first encoder 117. By this, the count value of the first counter becomes a value corresponding to the movement position of the second spray section 42B moving in the width direction X. The control section 100 acquires the movement position of the second spray section 42B in the width direction X from the count value of the first counter.

In the third example, a sixth sensor 116 is an origin sensor that detects that the spray section 42 is at an origin position in a direction (for example, the vertical direction Z) intersecting the medium M.

The second encoder 118 detects the rotation of the motor 79, which is the drive source for moving the spray section 42 in the vertical direction Z. When the control section 100 detects from the sixth sensor 116 that the spray section 42 is at the origin position in the vertical direction Z, the control section 100 resets the second counter (not illustrated). The control section 100 increments the second counter each time it detects a pulse edge of the encoder signal, which is a pulse signal input from the second encoder 118. By this, the count value of the second counter becomes a value corresponding to the movement position of the spray section 42 in the vertical direction Z. The control section 100 acquires the movement position of the spray section 42 in the vertical direction Z from the count value of the second counter.

The control section 100 includes a storage section 107. The storage section 107 may be provided in, for example, the third control section 103, or may be provided in a control section of another device that performs moistening control. The storage section 107 stores a program shown in the flowchart of FIG. 13. The control section 100 (for example, the third control section 103) performs the moistening control shown in FIG. 13 by executing the program read from the storage section 107.

Moistening Control

Next, moistening control performed by the control section 100 (third control section 103) will be described.

The movement section 46 moves the spray section 42 based on the size information of the medium M to be moistened. In other words, the control section 100 optimizes the moistening control in which the spray section 42 sprays the moistening liquid HL onto the medium M by controlling the movement section 46 based on the size information of the medium M. For example, the control section 100 acquires size information of the medium M from the record data PD. When the size information of the medium M is a first size, the control section 100 controls the movement section 46 to separate the spraying regions of the plurality of spray sections 42 further in the width direction X than when the size information of the medium M is a second size smaller than the first size. For example, in the moistening device 40 of each of the above embodiments having three spray sections 42, the movement section 46 is controlled as follows.

When the size information of medium M indicates a first size, the control section 100 moves the second spray section 42B such that the center-to-center spacing between the center region A1 and the edge region A2 is greater in the width direction X than when the size information indicates a second size that is smaller than the first size. In other words, when the size information of the medium M is the second size, the control section 100 moves the second spray section 42B such that the center-to-center spacing between the center region A1 and the edge region A2 is smaller in the width direction X than in a case where the size information is the first size, which is larger than the second size.

The movement section 46 moves the spray section 42 based on the target moistening amount. In other words, the control section 100 optimizes the moistening control in which the spray section 42 sprays the moistening liquid HL on the medium M by controlling the movement section 46 based on the target moistening amount. The target moistening amount refers to the amount of the moistening liquid HL per unit area of the medium M necessary for making the moisture percentage of the medium M uniform. In the present embodiment, the moistening liquid HL is sprayed onto the medium M, on which recording has been performed by the liquid ejection section 23 ejecting liquid such as ink. However, the liquid such as ink ejected onto the medium M contains a moistening component such as water. For this reason, the control section 100 obtains, for each unit area, a target moistening amount with which the medium M can have a target moisture percentage, including the amount of water and the like in the liquid such as ink on the medium M which is a moistening component.

Figure 14:
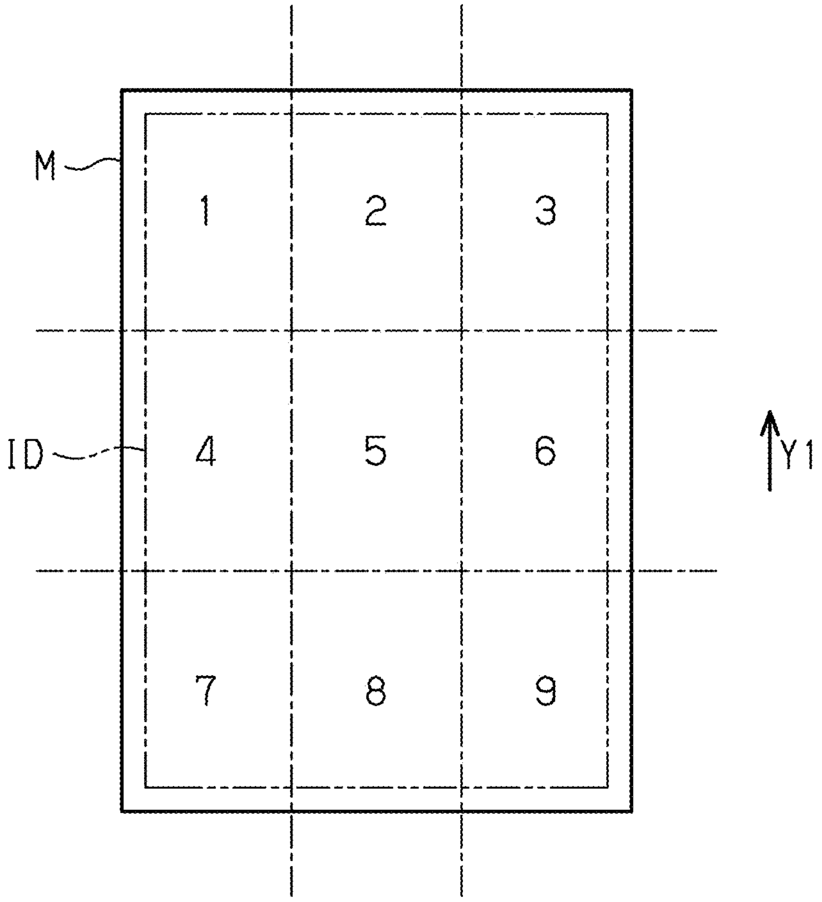
FIG. 14 is a plan view illustrating the division of the spray target area of the medium.

FIG. 14 illustrates an example in which the medium M to be moistened is divided into a plurality of regions each having a unit area. In the example illustrated in FIG. 14, one region obtained by dividing the medium M into n regions is set as a unit area, n being an integer of two or more. In FIG. 14, for example, n=9, wherein the medium M is divided into 9 parts. A region indicated by a two-dot chain line in FIG. 14 is the image region ID based on the image data. The image region ID is a region in which an image is recorded on the medium M by liquid such as ink being ejected by the liquid ejection section 23. In FIG. 14, the medium M is divided into n equal parts, but the medium M is not necessarily divided into equal parts with n=9.

The control section 100 calculates the amount of liquid such as ink adhering to the image region ID based on the image data. The control section 100 causes to eject liquid from the nozzles in an amount corresponding to the pixel value (density value) of each pixel in the image data. Therefore, the control section 100 calculates the amount of liquid for each region shown in FIG. 14 from the pixel value of the image data.

The moistening device 40 moistens the medium M on which recording has been performed by the liquid ejection section 23. The target moistening amount is set based on the amount of liquid ejected by the liquid ejection section 23. Here, the pixel value of the image data included in the record data PD may be indicated by a value of four gradations, for example. The control section 100 (for example, the first control section 101) calculates an ejection amount which is the amount of liquid droplets ejected from the nozzles of the liquid ejection section 23 based on the pixel values of four gradations of each pixel. The values of the four gradations correspond to the dot sizes of the droplets landed on the medium M. The values of the four gradations are indicated by 00 (no ejection), 01 (small dot), 10 (medium dot), and 11 (large dot).

For example, the maximum ejection amount, which is the ejection amount of a large dot, is regarded as 100%. An ejection amount obtained by representing each of the ejection amounts of no ejection, a small dot, and a medium dot in percentage with respect to the maximum ejection amount is referred to as a duty value. The control section 100 calculates the amount of liquid such as ink for each region based on the large, medium, and small dot sizes and the duty value for each dot size. Further, the control section 100 obtains the water content by recording for each region from the ratio of the moistening component (for example, water) in the liquid amount (for example, ink amount) for each region. The control section 100 acquires the target moistening amount corresponding to the type of the medium M from the storage section 107. The control section 100 calculates the moistening amount to be given by spraying for each region by subtracting the water content for each region from the target moistening amount. The target moistening amount may be set based on other factors such as temperature and moisture in addition to or instead of the type of the medium M.

The control section 100 controls the movement section 46 and the spray section 42 based on the moistening amount to be given by spraying which is obtained for each region of the medium M so as to apply the necessary moistening amount to the corresponding region. When the water content of the medium M is equal to or greater than a predetermined value, moistening is not performed. Therefore, the control section 100 determines whether the water content of the medium M is equal to or greater than a predetermined value. In a case where the water content of the medium M is less than a predetermined value, the control section 100 sprays the moistening liquid HL of an amount insufficient for the target moistening amount to the medium M. On the other hand, in a case where the water content of the medium M is equal to or greater than the predetermined value, since the water content satisfies the target moistening amount, the medium M is not moistened. Instead of the water content, moisture percentage may be used. The moisture percentage may be a weight of moisture per unit weight of the medium M or may be a volume of moisture per unit volume of the medium M. If it is not necessary to change the water content depending on the thickness of the medium M, the thickness of the medium M may be regarded as the unit thickness "1", and the water content per unit area of the medium M may be set as the moisture percentage. In a case where the thickness of the medium M is considered, the moisture percentage may be obtained using the thickness corresponding to the type of the medium M.

The control section 100 obtains the water content of the medium M based on the ejection amount of liquid ejected onto the medium M. For example, the control section 100 may obtain the water content, or the moisture percentage of the medium M based on the above-described image data formed of dot data included in the record data PD. In this case, the recording system 10 may include a sensor that detects either temperature or humidity. The control section 100 may obtain the water content, or the moisture percentage of the medium M based on either the temperature or the humidity. Further, the control section 100 may acquire the type of the medium M. The control section 100 may acquire the type of the medium M based on medium type information relating to the type of the medium M which is one piece of printing condition information included in the record data PD. The control section 100 may obtain the water content, or the moisture percentage of the medium M based on the medium type information.

The movement section 46 moves the spray section 42 based on the transport speed of the medium M by the first transport section 22. The control section 100 acquires the recording mode from the recording condition information. The recording mode includes a low-resolution recording mode and a high-resolution recording mode. The low resolution recording mode is a mode in which a low resolution image is recorded on the medium M by the liquid ejection section 23 ejecting liquid while transporting the medium M at a high transport speed. The high resolution recording mode is a mode in which a high resolution image is recorded on the medium M by the liquid ejection section 23 ejecting liquid while transporting the medium M at a low transport speed. The control section 100 controls the transport section 12 to transport the medium M at a transport speed corresponding to the recording mode acquired from the recording condition information. The control section 100 may change the transport speed of the transport section 41 of the moistening device 40 so that a necessary moistening amount per unit area of the medium M can be applied within a range in which the medium M does not stagnate.

The moistening amount per unit area of the medium M when the transport speed is the first transport speed is smaller than the moistening amount per unit area of the medium M when the transport speed is the second transport speed which is lower than the first transport speed. Therefore, the spray section 42 may be moved based on the transport speed. By this, it is possible to set an optimal moistening amount at each location of the medium M. By moving the spray section 42, it is possible to suppress a change in the spray amount and to suppress the use amount of the moistening liquid HL.

For example, in the moistening device 40 of the third example, the spray section 42 can be moved in a direction intersecting the medium M. The control section 100 may perform control to bring the spray section 42 closer to the medium M as the transport speed acquired from the information of the recording mode is higher. The control section 100 may perform control to increase the overlapping area of the spraying regions of the moistening liquid HL sprayed from the plurality of spray sections 42 by the pivotal movement or parallel movement of the second spray section 42B of the first example or the second example as the transport speed acquired from the information of the recording mode is faster. Furthermore, the control section 100 may increase the output at which the spray section 42 sprays the moistening liquid HL as the transport speed of the medium M increases. The increase in the output of spray section 42 increases the spray amount and the spray pressure of the moistening liquid HL per unit time. The transport speed may be acquired by the control section 100 based on an output signal of an encoder which detects rotation of a motor (not illustrated) which is a drive source of the third transport section 41 which transports the medium M.

Action of First Embodiment

Next, the operation of recording system 10 according to the first embodiment will be described. Here, the moistening control process performed by the control section 100 executing the program shown in FIG. 13 will be described. The process of determining the moisture percentage of the medium M may be performed for each region obtained by dividing the medium M into n regions as illustrated in FIG. 14.

First, in step S11, the control section 100 acquires the record data PD. For example, the user commands the recording system 10 (particularly, the recording device 20) to start recording by operating an operation section such as a keyboard of the host device. The control section 100 of the recording system 10 receives record data PD including an instruction to start recording from the host device. The record data PD includes recording condition information and image data. The recording condition information includes information such as the type of the medium M, the medium size, and the recording mode. Further, the recording condition information may include information such as post-processing conditions.

In step S12, the control section 100 acquires the moisture percentage W1 of the first surface Ma of the medium M. The control section 100 calculates the amount of liquid to be ejected onto the medium M by the liquid ejection section 23 based on image data in the record data PD. Further, the control section 100 calculates, for example, the contents of water, which is a moistening component in the liquid, from the amount of the liquid ejected onto the medium M. The control section 100 calculates a moisture percentage W1, which is the water content per unit surface area of the medium M. In addition, the control section 100 may calculate the moisture percentage W1 per unit volume of the medium M using thicknesses determined from the types of medium M. For example, when the medium M is paper sheet, thin paper and thick paper have different moisture percentages per unit volume even if the water contents per unit area are the same. Even when the amount of liquid ejected onto the medium M is the same, thin paper is more likely to curl than thick paper. Therefore, the ease of curling of the medium M may be evaluated in consideration of the thickness of the medium M. The thickness of the medium M is determined according to the type of the medium M (medium type) included in the recording condition information. The control section 100 may calculate the moisture percentage per unit volume based on the thickness of the medium M defined from the type of the medium M and the water content per unit area of the medium M. The control section 100 may calculate the moisture percentage W1 for each of n regions obtained by dividing the medium M into n.

The moisture percentage W1 may be calculated with reference to at least one of the humidity or the temperature detected by the third sensor 113. The third sensor 113 may be a moisture percentage sensor. In this case, the control section 100 may acquire the moisture percentage which is the detection result of the third sensor 113. The third sensor 113 formed of this type of moisture percentage sensor may be located downstream of the liquid ejection section 23 in the transport direction Y1 in the recording system 10, for example. In this case, the third sensor 113 detects the moisture percentage of the medium M on which recording has been performed and to which has been ejected liquid by the liquid ejection section 23. By this, the control section 100 acquires the moisture percentage W1 of the first surface Ma of the medium M.

In step S13, the control section 100 acquires the moisture percentage W2 of the second surface Mb of the medium M. The moisture percentage W2 of the second surface Mb is calculated by the same method as the method of calculating the moisture percentage W1 of the first surface Ma in step S11. The control section 100 calculates the moisture percentage W2 of the second surface Mb based on the water content per unit area acquired from the image data used for recording on the second surface Mb and the thicknesses of the medium M acquired from the information related to the types of the medium M.

In step S14, the control section 100 determines whether the moisture percentage W1 of the first surface Ma is equal to or greater than the first threshold WS1 (W1≥WS1). In this case, as shown in FIG. 14, if the moisture percentages of all the n regions are equal to or higher than the first threshold WS1, it may be determined that the 'W1≥WS1' condition is satisfied. It may be determined whether or not the moisture percentage W1 is equal to or higher than the first threshold WS1 for each of the n regions. The first threshold WS1 may be changed according to the type of medium M. For example, the first threshold WS1 may be changed according to the thickness of the medium M. For example, in a case where the medium M is paper sheet, thin paper is more likely to curl than thick paper. Therefore, the first threshold WS1 may be set to a larger value for thick paper that has large thickness for the medium M than for thin paper that has small thickness. If the 'W1≥WS1' condition is satisfied, the control section 100 proceeds to step S15. On the other hand, if the 'W1≥WS1' condition is not satisfied, the control section 100 proceeds to step S16. Note that whether or not the 'W1≥WS1' condition is satisfied may be individually determined for each of the n regions, and the processing of step S14 and subsequent steps may be performed for each of the n regions.

In step S15, the control section 100 determines whether or not the moisture percentage W2 of the second surface Mb is equal to or higher than the second threshold WS2 (W2≥WS2). Also, for the second surface Mb, it may be determined whether or not the 'W2≥WS2' condition is satisfied for each of the n regions shown in FIG. 14. In this case, it may be determined that the 'W2≥WS2' condition is satisfied if the moisture percentage is equal to or greater than the second threshold WS2 in all of the n regions. It may be determined whether or not the moisture percentage W2 is equal to or higher than the second threshold WS2 for each of the n regions. Similarly to the first threshold WS1, the second threshold WS2 may be changed according to the type of the medium M. If the 'W2≥WS2' condition is satisfied, the control section 100 proceeds to step S17. If the 'W2≥WS2' condition is not satisfied, the control section 100 proceeds to step S18.

On the other hand, in step S16, the control section 100 determines whether or not the moisture percentage W2 of the second surface Mb is equal to or higher than the second threshold WS2 (W2≥WS2). This determination processing is the same as the processing in step S15. If the 'W2≥WS2' condition is satisfied, the control section 100 proceeds to step S19. If the 'W2≥WS2' condition is not satisfied, the control section 100 proceeds to step S20. In the steps S14 to S16, thresholds WS1 and WS2 correspond to an example of the target moistening amount. The thresholds WS1 and WS2 are preferably 5% or more, for example. Further, the thresholds WS1 and WS2 are more preferably 8% or more, for example.

In step S17, the control section 100 transports the medium M. In other words, the medium M is transported without spraying the moistening liquid HL. By this, when the moisture percentage W1 of the first surface Ma of the medium M is greater than or equal to the first threshold WS1 and the moisture percentage W2 of the second surface Mb of the medium M is greater than or equal to the second threshold WS2, the water content of the medium M is sufficient, and thus the medium M is not moistened. For example, when double-sided recording is performed on the medium M and the water content contained in the liquid attached to both sides is sufficient with respect to the amount necessary to suppress curling, it is not necessary to moisten the medium M.

In step S18, the control section 100 transports the medium M while spraying the moistening liquid HL onto the second surface Mb of the medium M. As described above, when the moisture percentage W1 of the first surface Ma of the medium M is equal to or higher than the first threshold WS1 and the moisture percentage W2 of the second surface Mb of the medium M is lower than the second threshold WS2, the moistening liquid HL is sprayed to the second surface Mb of the medium M in an amount insufficient for the target moistening amount. For example, this corresponds to a case of single-sided recording in which liquid is ejected onto only the first surface Ma. Even in the case of single-sided recording or double-sided recording, when a predetermined amount or more of liquid is attached to only one side, the medium M is easily curled. The medium M is easily swollen and extended by the liquid on the surface side to which the liquid is attached. When only one side of the medium M is stretched, the medium M curls. For this reason, if the moisture percentages W1 and W2 of both surfaces of the medium M are equal to or greater than the respective thresholds SW1 and SW2, both surfaces of the medium M is swollen and extended together according to the respective water contents, and thus curling of the medium M is suppressed.

In step S19, the control section 100 transports the medium M while spraying the moistening liquid HL on the first surface Ma of the medium M. In this manner, when the moisture percentage W1 of the first surface Ma of the medium M is less than the first threshold WS1 and the moisture percentage W2 of the second surface Mb of the medium M is equal to or greater than the second threshold WS2, the moistening liquid HL is sprayed to the first surface Ma of the medium M in an amount insufficient for the target moistening amount. For example, this corresponds to a case of single-sided recording in which the liquid is ejected onto only the second surface Mb. Even in the case of single-sided recording or double-sided recording, when a predetermined amount or more of liquid is attached to only one side, the medium M is easily curled. For example, even in double-sided recording, in a case where a predetermined amount or more of liquid adheres only to the second surface Mb, but a predetermined amount or more of liquid does not adhere to the first surface Ma, the medium M is easily curled. When the moistening amount of the first surface Ma reaches the target moistening amount due to the spraying of the moistening liquid HL, the moisture percentages W1 and W2 of both surfaces of the medium M together exceed the thresholds WS1 and WS2. In this case, since both surfaces of the medium M is swollen and extended together in accordance with the respective water contents, curling of the medium M is suppressed.

In step S20, the control section 100 transports the medium M while spraying the moistening liquid HL on the first surface Ma and the second surface Mb of the medium M. In this manner, when the moisture percentage W1 of the first surface Ma of the medium M is less than the first threshold WS1 and the moisture percentage W2 of the second surface Mb of the medium M is less than the second threshold WS2, the moistening liquid HL is sprayed to the first surface Ma and the second surface Mb of the medium M in an amount insufficient for the target moistening amount. For example, this corresponds to a case of single-sided recording with a small printing amount or a case of double-sided recording with a small printing amount on both sides. When the moistening amounts of both the first surface Ma and the second surface Mb reach the target moistening amount due to the spraying of the moistening liquid HL, the moisture percentages W1 and W2 of both surfaces of the medium M become equal to or greater than the thresholds WS1 and WS2. In this case, since both surfaces of the medium M is swollen and extended in accordance with the respective water contents satisfying the target moistening amount, curling of the medium M is suppressed.

In addition, in a case where the moisture percentage is acquired for each region obtained by dividing the medium M into n, the region in which the moisture percentage is less than the threshold value may be selected, and the moistening liquid HL may be sprayed by the spray section 42. The control section 100 acquires the position of the region in which the moisture percentage is less than the threshold value from the transport position of the medium M and the numbers indicating the positions of the n regions on the medium M. The control section 100 controls the movement of the spray section 42 and the output for switching between spraying and blocking of the spray section 42 so that a target region on the medium M can be selected. The spray section 42 includes an electromagnetic valve such as an electromagnetic needle valve that opens and closes the spray port. The control section 100 controls the electromagnetic valve to control the position of the needle valve accommodated in the spray port of the spray section 42 in accordance with the region to which the spray port of the moved spray section 42 is directed, thereby switching the opening and closing of the spray port and the spray amount of the moistening liquid HL in the open state.

The control section 100 causes the spray section 42 to spray the moistening liquid HL in an amount insufficient for the target moistening amount when the spray section 42 is at a position directed to the target region by the movement section 46. When the spray section 42 is not directed to the target region, the control section 100 causes the spray section 42 to stop spraying the moistening liquid HL. In addition, the insufficient amount with respect to the target moistening amount differs between the regions where the moisture percentage is less than the threshold. Therefore, the spray amount per unit area of the spray section 42 may be adjusted so that the moistening liquid HL can be sprayed in an amount that is insufficient for each region. As a method of adjusting the spray amount per unit area of the spray section 42, the movement speed of the spray section 42 may be changed, the distance of the spray section 42 with respect to the medium M may be changed, or the output of the spray section 42 may be changed. Alternatively, two or three of these may be combined. The change in the output of spray section 42 may include at least one of a change in a spray amount per unit time and a change in a spread angle at which spray section 42 performs spraying.

Effects of First Embodiment

Therefore, according to the first embodiment, the following effects can be obtained.

1: In the first embodiment, the moistening device 40 includes the transport section 41, the spray section 42, and the movement section 46. The moistening device 40 moistens the medium M by spraying the moistening liquid HL thereon. The transport section 41 transports the medium M along the transport direction Y1. The spray section 42 sprays the moistening liquid HL onto the medium M transported by the transport section 41. The movement section 46 moves the spray section 42. According to this configuration, by moving the spray section 42, it is possible to optimize moistening, for example, to cope with various sizes of the medium M without increasing the number of the spray sections 42, or to equalize the moistening amount of the entire medium M. Increasing the number of spray sections 42 in accordance with the maximum paper sheet width leads to an increase in manufacturing cost and an increase in power consumption. In contrast, according to the present embodiment, since the number of spray sections can be reduced as much as possible, it is possible to suppress an increase in manufacturing cost and an increase in power consumption. Since the spray section 42 moves, the spraying region can be widened as compared with a configuration in which the spray section is fixed. For example, the number of spray section 42 can be reduced as compared with the number of spray sections required according to the medium width in the case of a fixed type spray section. By this, the manufacturing cost of the moistening device 40 can be reduced. It is possible to uniformly apply moisture to one of the front and back surfaces of the medium M. It is not necessary to output-change control the output of spray section 42, and the coating amount can be adjusted.

2: Particularly, in the first example, the movement section 46 pivots the spray section 42 about the pivoting shaft 47 along the transport direction Y1. According to this configuration, by pivoting the spray section 42, the entire medium M of various sizes can be moistened without increasing the number of spray sections 42.

3: In the first example, the moistening device 40 includes the plurality of spray sections 42. The plurality of spray sections 42 includes the first spray section 42A and the second spray section 42B. The first spray section 42A sprays the moistening liquid HL to the center region A1 of the medium M in the width direction X intersecting the transport direction Y1. The second spray section 42B sprays the moistening liquid HL to the edge region A2, which is an area different from the center region A1 in the width direction X. The movement section 46 pivots the second spray section 42B about the pivoting shaft 47. According to this configuration, since the center region A1 is a region which is moistened regardless of the width size, the spray section 42 positioned at the center region A1 is not pivoted, and the spray section 42 positioned at the end section sides are pivoted. Therefore, it is possible to moisten the entire paper of various width sizes by the pivotal movement of the minimum number of spray sections 42.

4: In particular, in the second example, the movement section 46 moves the spray section 42 in the width direction X intersecting the transport direction Y1. According to this configuration, since the spray section 42 moves in the width direction X, it is possible to moisten the entire medium M having various width sizes without increasing the number of spray sections 42.

5: In the second example, the moistening device 40 includes the plurality of spray sections 42. The spray section 42 includes a first spray section 42A and the second spray A1 of the medium M in the width direction X. The second spray section 42B sprays the moistening liquid HL to the edge region A2, which is an area different from the center region A1 in the width direction X. The movement section 46 moves the second spray section 42B in the width direction X intersecting the transport direction Y1. According to this configuration, since the center region A1 is a region that is moistened regardless of the width size of the medium M, the first spray section 42A does not move, and the second spray section 42B, which is positioned on the end section side, moves in the width direction X, and thus it is possible to moisten the entirety of the medium M of various width sizes by the movement of the minimum number of spray sections 42.

6: In the third example, the movement section 46 moves the spray section 42 in a direction intersecting the medium M. According to this configuration, the spray section 42 moves in the direction intersecting the medium M, and thus it is possible to change a range sprayed by one spray section 42. Therefore, it is possible to entirely moisten the medium M having various width sizes without increasing the number of the spray section 42.

7: In particular, in the third example, the moistening device 40 moistens the medium M on which recording has been performed by the liquid ejection section 23. There is the plurality of spray sections 42, including a first spray section 42A and a second spray section 42B. The first spray section 42A sprays the moistening liquid HL to the center region A1 of the medium M in the width direction X. The second spray section 42B sprays the moistening liquid HL to the edge region A2, which is an area different from the center region A1 in the width direction X. The first spray section 42A is further away from the medium M than the second spray section 42B. According to this configuration, the medium M on which recording is performed by the liquid ejection section 23 such as an inkjet head is moistened by moisture in the liquid such as ink. In general, since the printing amount is larger toward the center of the medium M, the liquid ejection amount tends to be larger, and since the printing amount is smaller toward the end section of the medium M, the liquid ejection amount tends to be smaller. Therefore, by estranging the first spray section 42A of the central section from the medium M and bringing the second spray section 42B of the end section closer to the medium M, it is possible to relatively decrease the moistening amount of the center region A1 and relatively increase the moistening amount of the edge region A2, which is different from the center region A1. Therefore, uneven moistening of the medium M in the width direction X can be suppressed.

8: In the first embodiment, the movement section 46 moves the spray section 42 based on the size information of the medium M to be moistened. According to this configuration, the spray section 42 is moved based on the size information (particularly, information on the width size) of the medium M. For example, based on the size information of the medium M, the movement section 46 moves the spray section 42 to a position, direction, or distance at which the spray section 42 can spray substantially the entire area of the medium M in the width direction X. Therefore, it is possible to entirely moisten the medium M having various width sizes without increasing the number of the spray section 42.

9: The movement section 46 moves the spray section 42 based on the target moistening amount. According to this configuration, by moving the spray section 42 on the basis of the target moistening amount, it is possible to set an optimal moistening amount at each location of the medium M.

10: In particular, in the fourth example, the moistening device 40 comprises the plurality of spray sections 42. The spray section 42 includes a first spray section 42A and the second spray section 42B. The movement section 46 moves the first spray section 42A and the second spray section 42B such that the moistening amount of the first region A10, in which the moistening liquid HL is sprayed only by the first spray section 42A, and the moistening amount of the second region A20, in which the moistening liquid HL is sprayed by both the first spray section 42A and the second spray section 42B, are equal to each other. According to this configuration, since the sprayed moistening liquid HL is diffused at a predetermined spread angle, a difference in moistening amount may occur depending on the positional relationship with the spray section 42. At this time, the moistening amount of the second region A20 is increased by moistening the second region A20, which has a small moistening amount on the edge side of the spray range of the first spray section 42A, on the edge side of the spray range of the second spray section 42B. Then, by the moistening of the first spray section 42A and the second spray section 42B, the moistening amount of the second region A20 is increased to be equal to the moistening amount of the first region A10, which is moistened only by the first spray section 42A. In other words, the movement section 46 changes at least one of the positions, the orientations, and the distances of at least one of the first spray section 42A and the second spray section 42B by the movement to adjust the moistening amount of the second region A20 on the edge side of the spray range to the moistening amount of the first region A10 at the center of the spray range. Therefore, it is possible to suppress unevenness of the moistening amount in the width direction X of the medium M.

11: In the fourth example, the movement section 46 moves the spray section 42 so that the moistening amount is equal in the entire width direction X intersecting the transport direction Y1. According to this configuration, since the sprayed moistening liquid HL is diffused, a difference in moistening amount may occur depending on the positional relationship with the spray section 42. In addition, by moving the spray section 42 so that the moistening amount becomes uniform across the entire width direction X, it is possible to suppress the unevenness of the moistening amount in the width direction X. In the second example and the third example, the movement section 46 may move the spray section 42 such that the moistening amount is equal in the entire width direction X intersecting the transport direction Y1.

12: The moistening device 40 of the first embodiment moistens the medium M on which recording has been performed by the liquid ejection section 23. The target moistening amount is set based on the amount of liquid ejected by the liquid ejection section 23. According to this configuration, the medium M on which recording is performed by the liquid ejection section 23 such as an inkjet head is moistened by moisture in the liquid such as ink. Therefore, by setting the target moistening amount based on the liquid ejection amount, the final moisture percentage can be made more appropriate.

13: The moistening device 40 of the first embodiment does not perform moistening when the water content of the medium M is equal to or greater than a predetermined value. According to this configuration, since moistening is not performed in a case where moistening is not necessary, it is possible to avoid excessive moistening of the medium M. For example, insufficient drying caused by an excessive moistening amount of the medium M can be reduced. In addition, since the spray section 42 is not caused to perform wasteful spraying, power consumption can be suppressed.

14: The moistening device 40 of the first embodiment includes the first moistening unit 40A and the second moistening unit 40B. Each of the first moistening unit 40A and the second moistening unit 40B includes the spray section 42. The first moistening unit 40A sprays the moistening liquid HL onto the first surface Ma of the medium M. The second moistening unit 40B sprays the moistening liquid HL to a second surface Mb opposite to the first surface Ma of the medium M. According to this configuration, by moistening both surfaces of the medium M, it is possible to appropriately adjust the moistening amount of both the front and rear surfaces. For example, when the moisture percentage is different between the front surface and the rear surface of the medium M, this may cause curling. Since it is possible to appropriately adjust the moistening amount of both the front and back surfaces of the medium M, it is possible to effectively suppress curling of the medium M.

15: The recording system 10 of the first embodiment includes the recording device 20 that performs recording by ejecting liquid onto a medium M, and the moistening device 40. When recording is performed by ejecting liquid, curling may occur after the medium M is dried. However, curling can be suppressed by moistening the medium M with the moistening device 40.

16: The recording system 10 according to the first embodiment further includes the drying device 50 that dries the medium M recorded by the recording device 20 and moistened by the moistening device 40. According to this configuration, the medium M containing moisture due to recording and moistening is dried by the drying device 50, and thus it is possible to suppress curling of the medium M compared to a case of drying without moistening. In addition, since it is possible to fix the image on the medium M by drying, it is possible to improve the alignment properties of the medium M which is discharged from the drying device 50. For example, since the alignment property when the plurality of medium M is bundled in the post-processing device 60 is improved, it is possible to perform post-processing such as stapling processing or saddle stitching processing on the bundle of the medium M which are neatly aligned.

17: The recording system 10 illustrated in FIG. 1 further includes the inversion device 30 that inverts the medium M on which recording has been performed by the recording device 20. The moistening device 40 moistens the medium M inverted by the inversion device 30. According to this configuration, the moisture in the liquid such as ink applied by the recording is temporarily dried while being inverted by the inversion device 30, and then the amount of water is adjusted by the spraying of the moistening liquid HL by the moistening device 40. Therefore, compared to a configuration in which the moistening liquid HL is sprayed onto the medium M before the temporary drying, it is possible to perform the moistening while suppressing the bleeding of the ink recorded on the medium M. Then, after the curl is suppressed by the moistening, the moisture due to the moistening performed for suppressing the curl can be finally dried by the drying device 50.

18: The recording system 10 illustrated in FIG. 2 further includes the inversion device 30 that inverts the medium M on which recording has been performed by the recording device 20. The inversion device 30 inverts the medium M moistened by the moistening device 40. According to this configuration, the medium M on which the recording and the moistening have been performed is inverted by the inversion device 30, and thus it is possible to dry the moisture applied by recording and moistening by the transport time.

19: The recording system 10 further includes a post-processing device 60 that performs post-processing on the medium M recorded by the recording device 20 and moistened by the moistening device 40. According to this configuration, it is possible to suppress curling by moistening the medium M on which the post-processing is performed, and thus it is possible to improve the accuracy of the post-processing.

20: The recording system 10 may further include an acquisition section that acquires size information of the medium M to be moistened. The acquisition section may be the second sensor 112 that detects the size information, or may be a part of the control section 100 that acquires the size information from the recording condition information in the received record data PD. The control section 100 moves the spray section 42 based on the size information acquired by the acquisition section. According to this configuration, the control section 100 can entirely moisten the medium M having various width sizes without increasing the number of the spray sections 42 in accordance with the maximum size of the medium M by moving the spray section 42 based on the size information (particularly, information of the width size) of the medium M.

21: The intermediate unit 15 is provided between the recording device 20 that performs recording on the medium M and the post-processing device 60 that performs post-processing on the medium M on which recording has been performed by the recording device 20. The intermediate unit 15 transports the medium M from the recording device 20 to the post-processing device 60. The intermediate unit 15 includes the moistening device 40 that moistens the medium M. The intermediate unit 15 may further include the drying device 50 that dries the medium M. Further, the intermediate unit 15 may include the inversion device 30 that inverts the medium M. According to the intermediate unit 15, since the medium M on which recording has been performed can be moistened, curling of the medium M can be suppressed.

Second Embodiment

Next, a second embodiment will be described with reference to FIGS. 15 to 18. In the first embodiment, once the position of the spray section 42 is determined by the movement section 46, the spray section 42 is basically not moved with respect to the medium M which is being transported. In the second embodiment, the spray section 42 is moved by the movement section 46 while the medium M is being transported. The second embodiment differs from the first embodiment only in the configuration of the moistening device 40 and the manner in which the spray section 42 is moved during the transport of the medium M, with all other configurations of the recording system 10 and other control aspects of the moistening device 40 being the same as those in the first embodiment. Further, in the second embodiment, the configurations of the moistening units 40A and 40B are basically the same, and therefore only the configuration of one moistening system of the moistening device 40 will be described below.

Fifth Example

Figure 15:
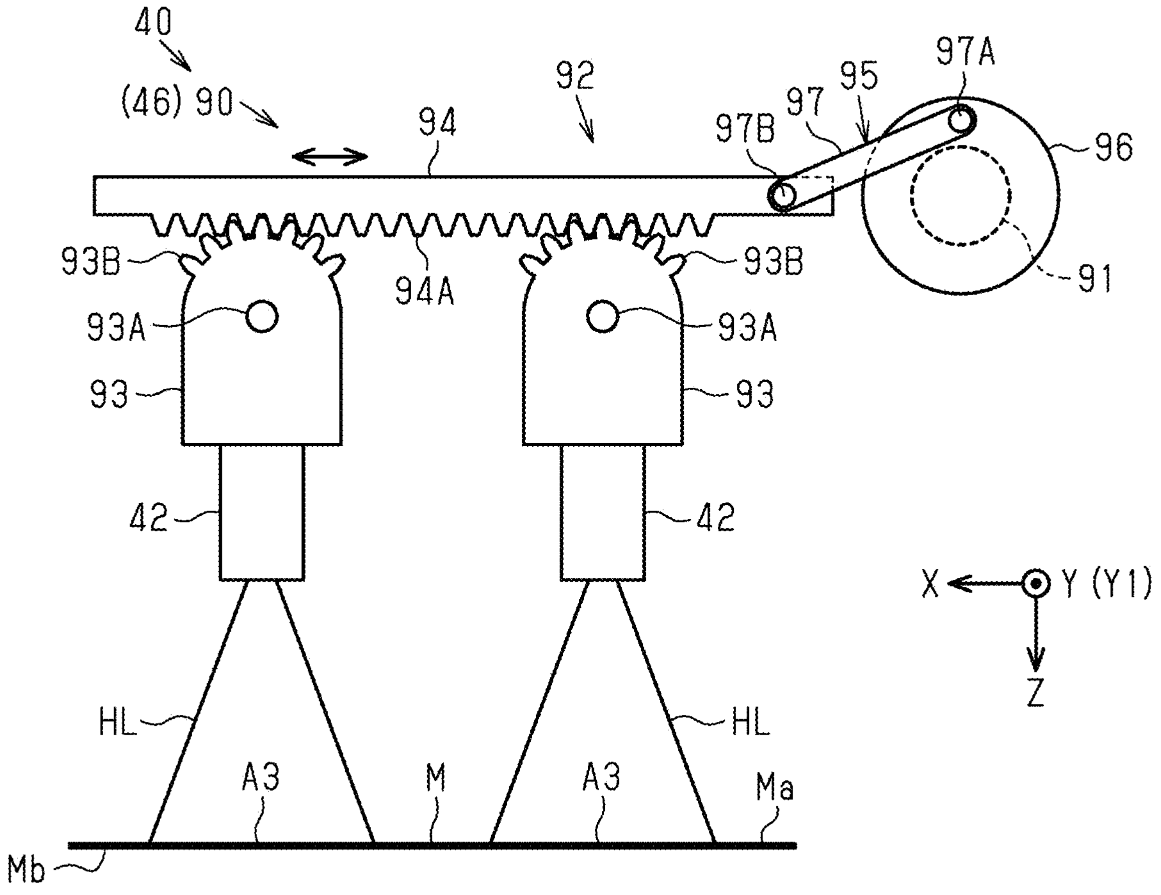
FIG. 15 is a schematic side view showing a moistening device of a fifth example of the second embodiment.

First, an main section of the moistening device 40 of the fifth example will be described with reference to FIG. 15. As shown in FIG. 15, the moistening device 40 includes the spray section 42 and a movement section 46. The spray section 42 is provided as one or a plurality, but example of two spray sections 42 will be described. The moistening device 40 includes a movement section 46 for moving the plurality of spray sections 42.

The movement section 46 moves the spray section 42 in the width direction X, which is a direction intersecting the transport direction Y1 of the medium M. In other words, the movement section 46 is a parallel moving mechanism 90 which moves the spray section 42 in the width direction X, which is a direction parallel to the medium M.

The parallel moving mechanism 90 includes a motor 91 which is a drive source, and a power transmission mechanism 92 which transmits the driving force of the motor 91 to the spray section 42. The power transmission mechanism 92 includes a movable section 93 that supports the spray section 42, a rack 94, and a link mechanism 95. The movable section 93 is supported so as to be pivotable around a pivoting shaft 93A along the transport direction Y1. The movable section 93 has a plurality of tooth section 93B formed along a virtual circular arc around the pivoting shaft 93A at the end section on the opposite side to the spray section 42 side. The rack 94 is arranged in a posture that is the longitudinal direction thereof is parallel to the width direction X. A plurality of tooth sections 94A capable of meshing with the tooth section 93B of the movable section 93 are formed at a constant pitch in the width direction X on the surface section of the rack 94 facing the movable section 93. The tooth section 94A of the rack 94 and the tooth section 93B of the movable section 93 are engaged with each other. When the rack 94 reciprocates in the width direction X, which is the longitudinal direction of the rack 94, the spray section 42 pivots about the pivoting shaft 93A within a predetermined angular range through the engagement between the tooth section 93B and 94A.

The link mechanism 95 includes a rotating plate 96 and a link member 97. The rotating plate 96 is rotated by the driving force of the motor 91. The rotating plate 96 is, for example, a circular plate. The link member 97 is a plate member having a predetermined length. Both end portions of the link member 97 are coupled to the peripheral edge section of the rotating plate 96 and one end section of the rack 94 on the rotating plate 96 side via two pins 97A and 97B. In other words, one end section of the link member 97 is pivotably coupled to the peripheral edge section of the rotating plate 96 via the pin 97A. The other end section of the link member 97 is pivotably coupled to one end of the rack 94 via the pin 97B.

When the rotating plate 96 is rotated by the driving of the motor 91, one end section of the link member 97 performs a circular motion along with the rotation of the rotating plate 96, and thus the other end section of the link member 97 moves in the width direction X. By the movement in the width direction X, the rack 94 coupled to the other end section of the link member 97 via the pin 97B reciprocates in the width direction X. The movable section 93 is pivoted about the pivoting shaft 93A by the power transmitted from the reciprocating rack 94 via the tooth sections 93B and 94A. In this way, the plurality of spray sections 42 pivot back and forth within a predetermined angular range, so that the spraying area A3 on the medium M of the moistening liquid HL sprayed from the spray sections 42 moves back and forth in the width direction X.

Sixth Example

Next, the main section of the moistening device 40 of the sixth example will be described with reference to FIG. 16. The moistening device 40 shown in FIG. 16 differs from the fifth example in the configuration of the parallel moving mechanism 90 as the movement section 46. The parallel moving mechanism 90 shown in FIG. 16 includes the motor 91 as a drive source and the power transmission mechanism 92, as in the fifth example. The configurations of the movable section 93 and the rack 94 of the power transmission mechanism 92 are the same as those of the fifth example. The configuration in which the rack 94 is reciprocated by the driving force of the motor 91 is different from that of the fifth example.

Figure 16:
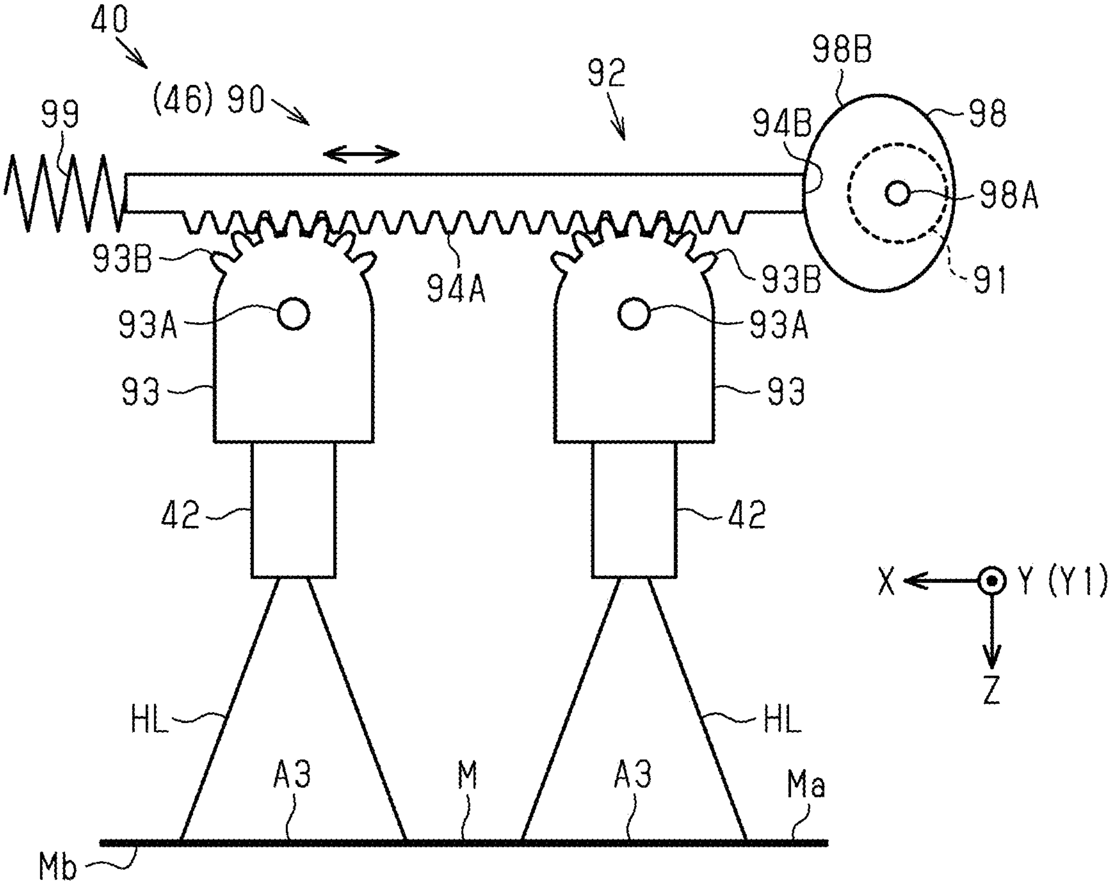
FIG. 16 is a schematic side view showing the moistening device of the sixth example.

As shown in FIG. 16, the power transmission mechanism 92 includes the movable section 93 and a rack 94 in addition to an eccentric cam 98 and a spring 99. The eccentric cam 98 has an elliptical shape. The eccentric cam 98 eccentrically rotates around an eccentric shaft 98A by the driving force of the motor 91. A cam follower 94B formed of one end section of a rack 94 is in contact with a cam surface 98B formed of an outer peripheral surface of the eccentric cam 98. The spring 99 biases the rack 94 in a direction in which the rack 94 is pressed against the eccentric cam 98. Therefore, when the eccentric cam 98 is rotated by the driving of the motor 91, the rack 94 reciprocates in the width direction X.

The movable section 93 is pivoted about the pivoting shaft 93A by the power transmitted via the tooth section 93B and 94A, whereby the spray section 42 is pivoted in a reciprocating manner within a predetermined angular range. By this, the spraying area A3 on the medium M of the moistening liquid HL sprayed from the spray section 42 moves back and forth in the width direction X.

Seventh Example

Figure 17:
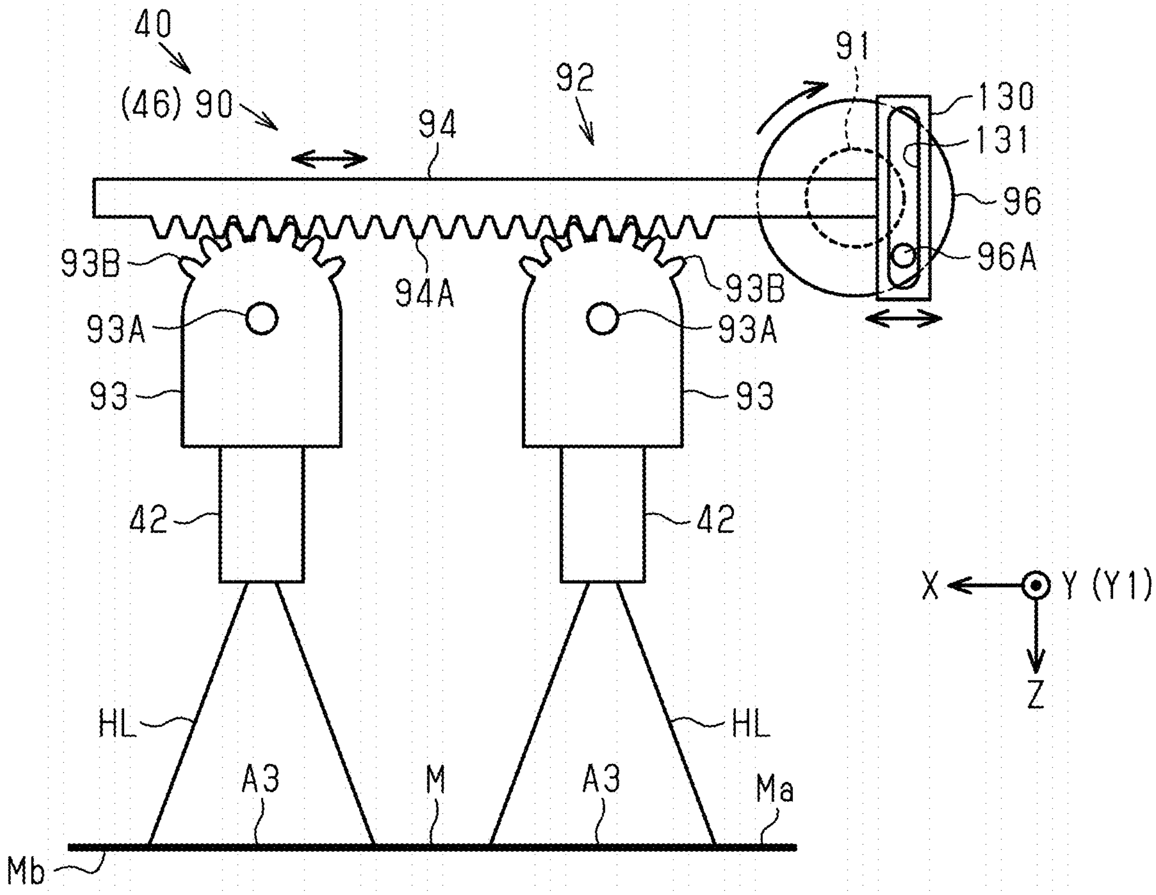
FIG. 17 is a schematic side view showing the moistening device of the seventh example.

Next, the main section of the moistening device 40 of the seventh example will be described with reference to FIG. 17. The moistening device 40 shown in FIG. 17 is different from the fifth and sixth examples in the configuration of the parallel moving mechanism 90, which is the movement section 46. The parallel moving mechanism 90 shown in FIG. 17 includes the motor 91 as a drive source and the power transmission mechanism 92. The configurations of the movable section 93 and the rack 94 in the power transmission mechanism 92 are the same as those in the fifth and sixth example. This embodiment is different from the fifth and sixth examples in that the rack 94 is reciprocated by the driving force of the motor 91.

As shown in FIG. 17, the power transmission mechanism 92 includes the rotating plate 96 and a guide member 130 in addition to the movable section 93 and the rack 94. The rotating plate 96 is rotated by the driving force of the motor 91. The rotating plate 96 has a pin 96A at its peripheral edge section. One side surface (left side surface) of the guide member 130 is fixed to one end section of the rack 94. The guide member 130 has a vertically long shape and has an elongated hole 131 extending along the longitudinal direction thereof. The pin 96A is inserted into the elongated hole 131.

When the rotating plate 96 is rotated by the driving of the motor 91, the pin 96A is caused a rotational movement. This rotational movement of the pin 96A causes the guide member 130 to reciprocate in the width direction X while the pin 96A reciprocates in the elongated hole 131. By this, the rack 94 reciprocates in the width direction X together with the guide member 130.

The movable section 93 is pivoted about the pivoting shaft 93A by the power transmitted via the tooth section 93B and 94A, whereby the spray section 42 is pivoted in a reciprocating manner within a predetermined angular range. By this, the spraying area A3 on the medium M of the moistening liquid HL sprayed from the spray section 42 moves back and forth in the width direction X.

The control section 100 controls the movement section 46 to move the spray section 42 so that the moistening amount is equal in the entire width direction X intersecting the transport direction Y1. In this way, the movement section 46 moves the spray section 42 so that the moistening amount is equal in the entire width direction X intersecting the transport direction Y1. The moistening liquid HL sprayed from the spray section 42 diffuses. The moistening amount may vary depending on the positional relationship with the spray section. Furthermore, by moving the spray section 42 so that the moistening amount is uniform across the entire width direction, it is possible to reduce the variation in the moistening amount in the width direction X.

Action of Second Embodiment

Next, the action of recording system 10 according to the second embodiment will be described. The moistening control executed by the control section 100 in the moistening device 40 including the two spray sections 42 and the movement section 46 (parallel moving mechanism 90) shown in FIGS. 15 to 17 will be described.

The control section 100 acquires the transport position of the medium M transported into the moistening device 40. When the leading end of the medium M enters the moisten region of the spray section 42, the control section 100 causes the spray section 42 to start spraying the moistening liquid HL. The control section 100 causes the two spray sections 42 to pivot about the pivoting shaft 93A by driving the motor 91. Two spray sections 42 pivot back and forth about the pivoting shaft 93A within a predetermined angular range. The predetermined angle range is set in accordance with the medium M having the maximum width. The control section 100 acquires the size information from the recording condition information or the detection result of the second sensor 112. The control section 100 controls the spray range according to the width size of the medium M specified from the size information. The control section 100 controls the angle range of spraying by the spray section 42 by switching the electromagnetic valve on and off.

Figure 18:
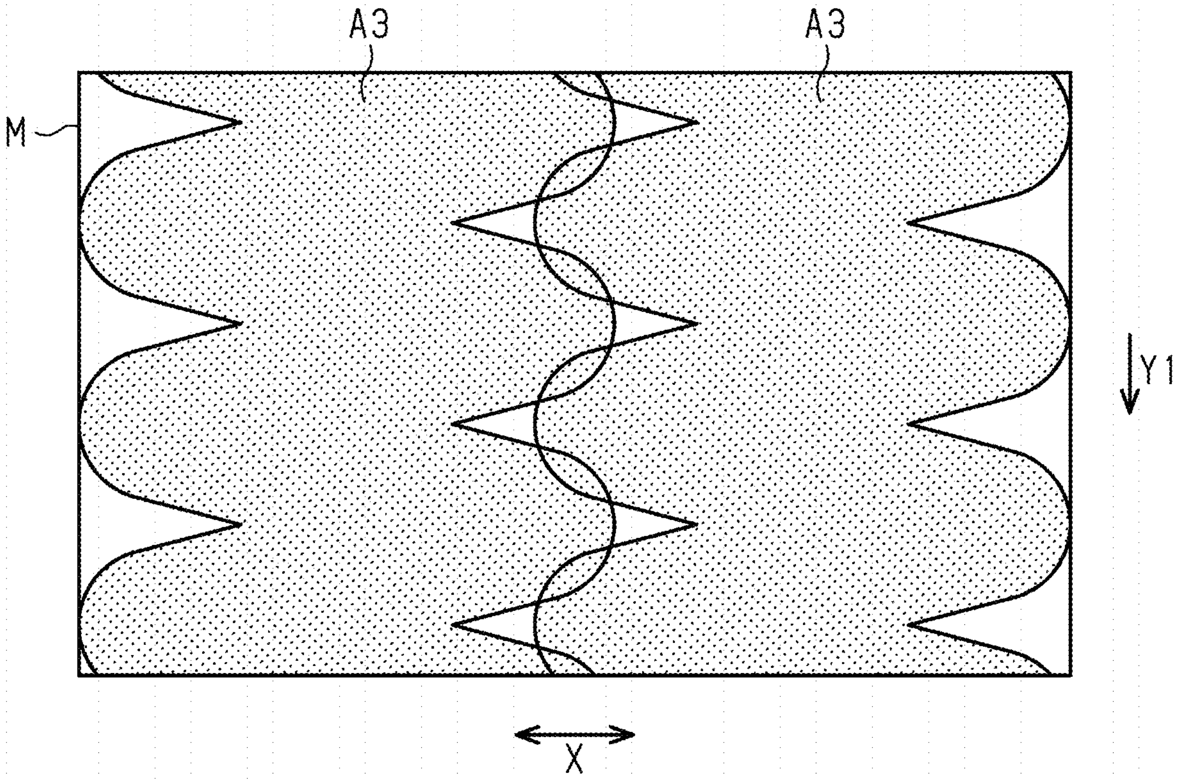
FIG. 18 is a schematic plan view showing a spraying region of the moistening liquid in the medium.

FIG. 18 illustrates a spraying area A3 of the medium M sprayed with the moistening liquid HL by the spray section 42. Two spray sections 42 spray the moistening liquid HL from the respective spray ports while pivoting back and forth about the pivoting shaft 93A along the transport direction Y1. The medium M to be sprayed are transported in the transport direction Y1 at a constant transport speed. A locus of an intersection between an axial line passing through a spray port of the spray section 42 and the medium M is defined as a spray path. The spray section 42 sprays the moistening liquid HL on the medium M such that a spray path draws a zigzag on the medium M transported in the transport direction Y1 at a constant transport speed. As a result, as shown in FIG. 18, the moistening liquid HL adheres to the two rows of zigzag-shaped spraying area A3 extending along the transport direction Y1. For this reason, it is possible to spray the moistening liquid HL substantially uniformly on the entire surface of the medium M with respect to the medium M having different width sizes by a small number of two spray sections 42. Here, the width of the spraying area A3 with the zigzag spray path as the center line can be changed by changing the output of the spray section 42. The control section 100 sets a first output, which is an output of the spray section 42 when the transport speed of the medium M is a first speed, to be larger than a second output, which is an output of the spray section 42 when the transport speed of the medium M is a second speed lower than the first transport speed. That is, the control section 100 increases the output of the spray section 42 as the transport speed of the medium M increases. When the output of the spray section 42 is increased, the spray pressure is increased and thus the spread angle is increased. In this way, the control section 100 may control the spray section 42 such that the spraying area A3 becomes wider as the transport speed of the medium M increases. The movement section 46 may be configured by adding, for example, the elevating mechanism 71 shown in FIG. 9, which enables the parallel moving mechanism 90 of the fifth to seventh examples to up and down. In this case, the control section 100 may perform control to widen the spraying area A3 by controlling the elevating mechanism 71 of the movement section 46 to move the spray section 42 away from the medium M. For example, as the transport speed of the medium M increases, the control section 100 raises the spray section 42 to increase the distances between the spray section 42 and the medium M, thereby increasing the width of the spraying area A3. By this, even when the transport speed of the medium M is changed, it is possible to perform optimization in which the moistening liquid HL is uniformly sprayed on the entire surface of the medium M.

In the configuration including the movement section 46 shown in FIGS. 15 to 17, a elongate guide member may be used instead of the rack 94, and a plurality of (for example, two) spray sections 42 may be fixed to the guide member at intervals in the width direction X. By this, when the motor 91 is rotationally driven, the guide member reciprocates in the width direction X, and thus the plurality of spray sections 42 reciprocates in the width direction X. In other words, the movement section 46 is configured as a parallel moving mechanism. The moistening liquid HL can be sprayed to the zigzag-shaped spraying area A3 shown in FIG. 18 also by the movement section 46 formed of this type of parallel moving mechanism. The moistening liquid HL may be sprayed so that the edge side sections of the zigzag-shaped spraying area A3 shown in FIG. 18 overlap each other. By this, the moistening liquid HL may be substantially uniformly sprayed over the entire area of the medium M in the width direction X.

Figure 19:
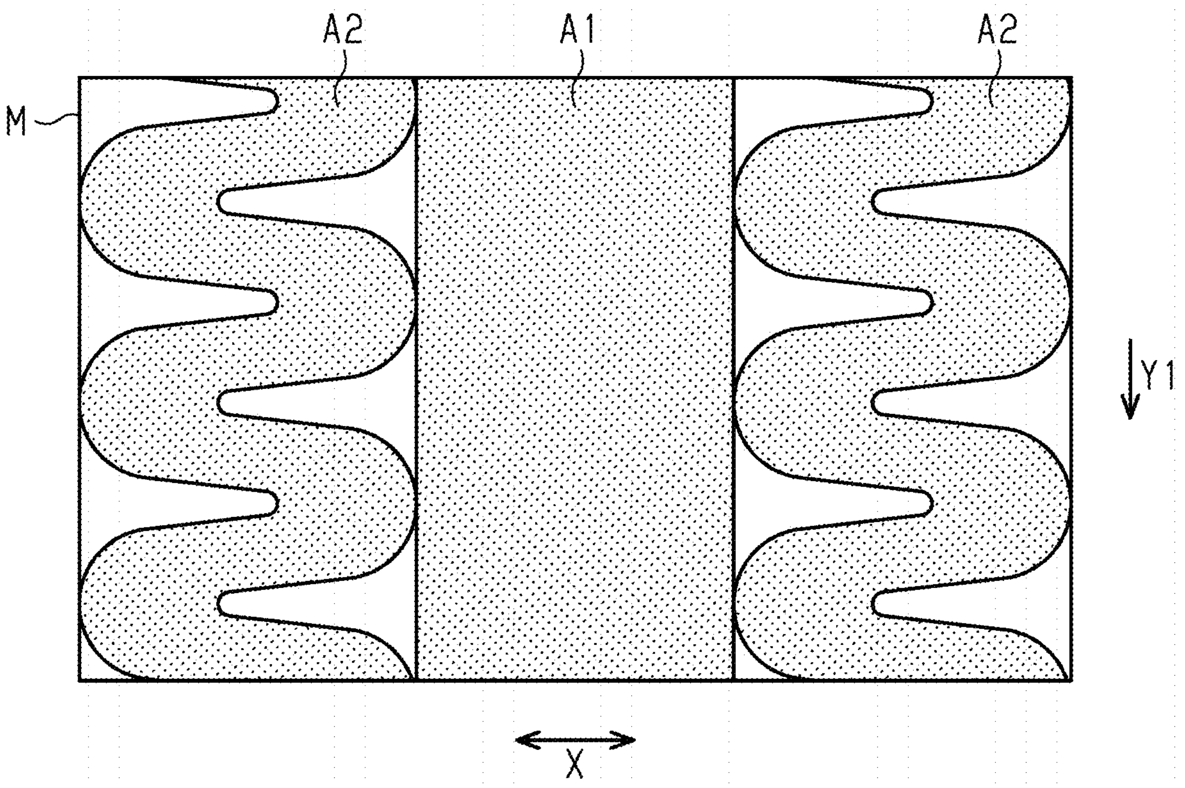
FIG. 19 is a schematic plan view illustrating a spraying region of the moistening liquid in the medium in the modified example.

Furthermore, in the configuration including the movement section 46 shown in FIGS. 15 to 17, a configuration may be adopted in which the two spraying areas A3 are the edge regions A2 by adding a fixed-type first spray section 42A at the center position in the width direction X of the two spray sections 42. In this case, as shown in FIG. 19, in the width direction X, the moistening liquid HL can be sprayed to the center region A1 and the edge regions A2 (spraying regions) on both sides of the center region A1, the edge regions A2 drawing a zigzag-shaped spray path. In addition, similarly to the third example, a configuration may be adopted in which the two spray sections 42 are set as the second spray sections 42B, and the first spray section 42A is further away from the medium M in the direction (for example, the vertical direction Z) intersecting the medium M than the second spray sections 42B.

Figure 13:
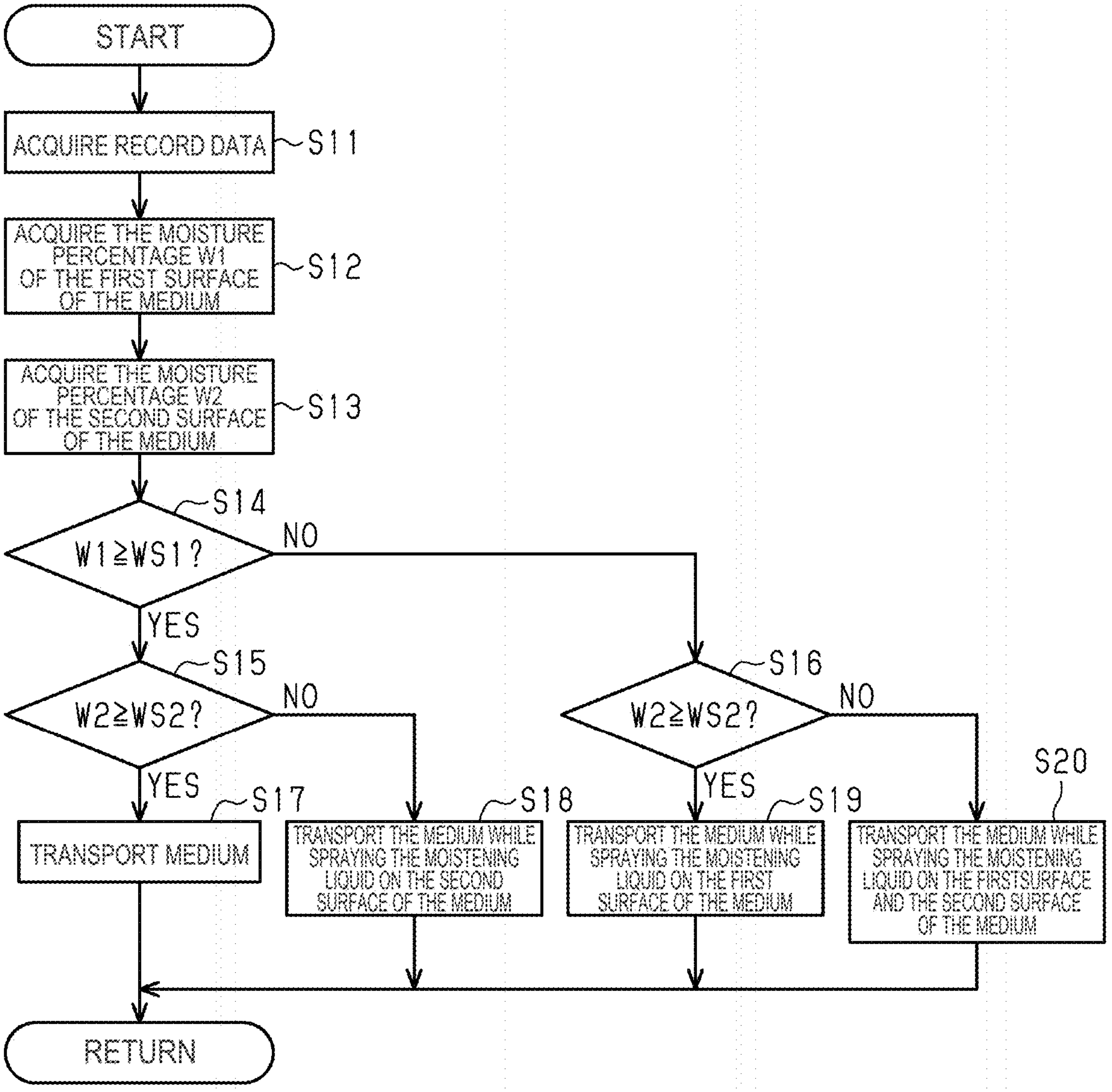
FIG. 13 is a flowchart showing the moistening control process step.

The control section 100 can also execute the program shown in FIG. 13. The control section 100 determines the moisture percentage for each region obtained by dividing the medium M into n regions as illustrated in FIG. 14. Control may be performed to spray the moistening liquid HL in an amount corresponding to a deficiency in the target moistening amount to a region where the moisture percentage is less than the threshold value. The control section 100 may adjust the spray amount of the moistening liquid HL by the pivotal speed of the spray section 42 and the on/off control of the electromagnetic valve of the spray section 42. When the electromagnetic valve of the spray section 42 is capable of changing the opening degree or the flow rate, the spray amount per unit time of the spray section 42 may be adjusted by changing the opening degree or the flow rate.

Effects of Second Embodiment

Therefore, according to the second embodiment, the effects of 1: to 21: in the first embodiment can be similarly obtained. In particular, the following effects are obtained.

22: The movement section 46 pivots the spray section 42 about the pivoting shaft 93A along the transport direction Y1. According to this configuration, by pivoting the spray section 42, the entire medium M of various sizes can be moistened without increasing the number of spray sections 42.

23: The movement section 46 of the second embodiment moves the spray section 42 while the medium M is being transported by the transport section 41. For example, the movement section 46 causes the spray section 42 to swing as the movement of the spray section 42 while the medium M is being transported. Therefore, it is possible to moisten the entire medium M in the width direction X without increasing the number of spray sections 42.

24: The movement section 46 of the second embodiment moves the spray section 42 based on the transport speed of the medium M by the transport section 41. According to this configuration, since the moistening amount per unit area changes depending on the transport speed, it is possible to set an optimal moistening amount at each place of the medium M by moving the spray section 42 based on the transport speed. The spray section 42 moves in response to a change of the transport speed. For example, in a configuration in which the spray amount is changed in accordance with a change in the transport speed, when the transport speed is increased, it is necessary to increase the injection amount. On the other hand, since the moving speed of the spray section 42 is changed according to the change in the movement speed, it is possible to suppress an increase in the spray amount and to suppress the use amount of the moistening liquid HL.

25: The movement section 46 of the second embodiment includes the motor 91, which is a common drive source for synchronizing the movement of the plurality of spray sections 42, and the power transmission mechanism 92. Therefore, since the plurality of spray sections 42 move in synchronization with each other, it is possible to efficiently spray the moistening liquid HL over a wide range of the medium M while suppressing inappropriate overlapping of the spraying regions.

The above-described embodiment may be changed into the embodiment such as the following modified examples. Further, an appropriate combination of the above-described embodiment and the modified examples described below may be used as a further modified example, and an appropriate combination of modified examples described below may be used as a further modified example.

Figure 20:
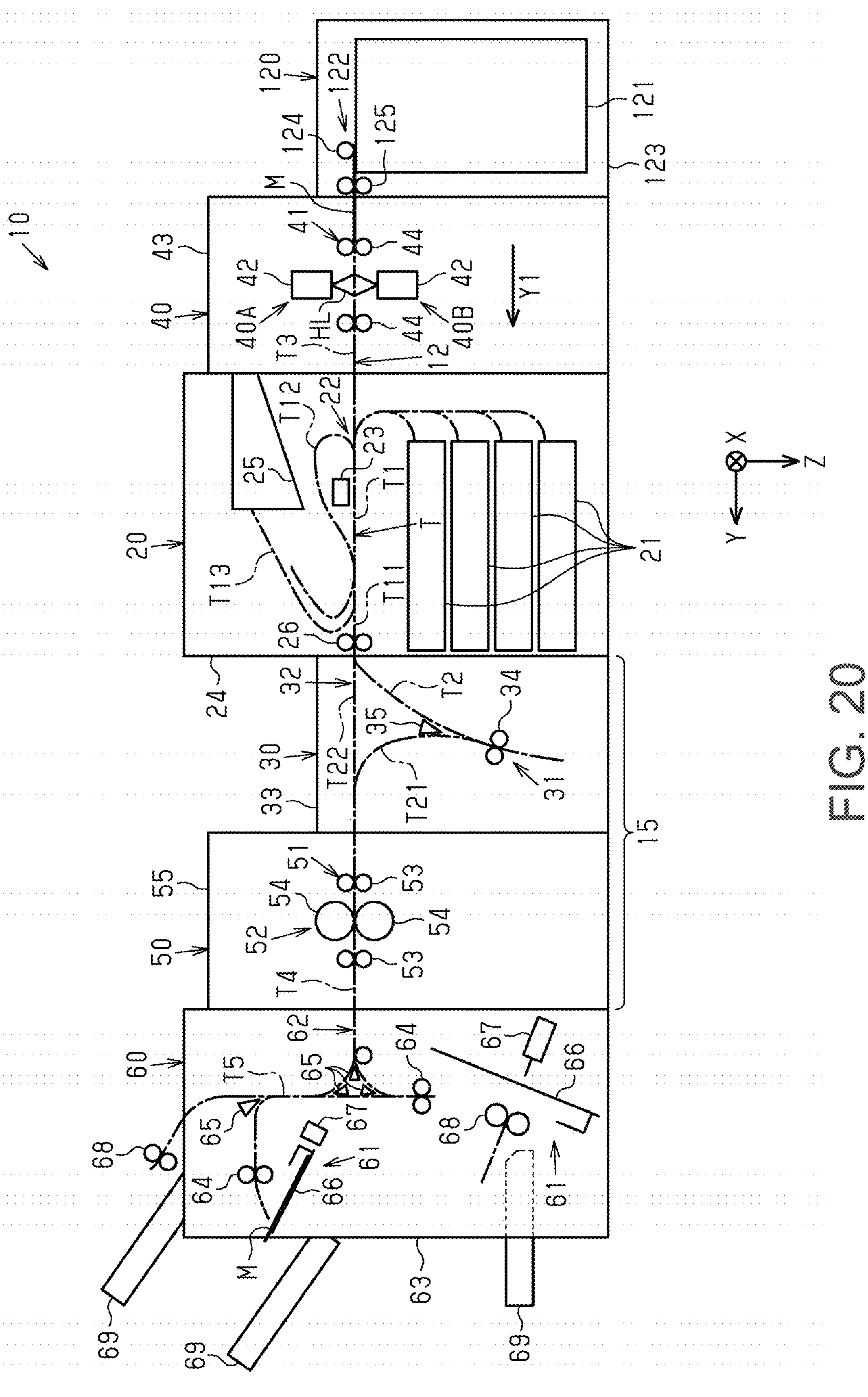
FIG. 20 is a schematic front view showing a recording system according to a modified example.

The recording system 10 may have a third configuration shown in FIG. 20 instead of the first configuration shown in FIG. 1 and the second configuration shown in FIG. 2. In other words, the recording system 10 may have a configuration in which a medium feeding device 120, the moistening device 40, the recording device 20, the inversion device 30, the drying device 50, and the post-processing device 60 are disposed in order from the upstream side in the transport direction Y. The medium feeding device 120 includes a medium accommodation section 121 and a feed section 122. The medium feeding device 120 may include a housing 123 that houses the medium accommodation section 121 and the feed section 122. The medium accommodation section 121 includes a large cassette or basket capable of accommodating the medium M of which the number is equal to or greater than twice the maximum number of stackable sheets of the cassette 21 (refer to FIG. 1). The feed section 122 includes a feed roller 124 and a discharge roller pair 125. The feed roller 124 feeds the medium M one by one from the medium accommodation section 121. The discharge roller pair 125 feeds the medium M to the outside of the housing 123 at a position downstream of the feed roller 124. The medium feeding device 120 supplies the medium M to the moistening device 40. As described above, the recording device 20 illustrated in FIG. 20 performs recording on the medium M moistened by the moistening device 40. In the third configuration, the control section 100 illustrated in FIG. 12 may include a sixth control section 106 which controls the medium feeding device 120, and the sixth control section 106 is indicated by a two-dot chain line in the same figure. According to this configuration, it is possible to perform recording on the medium M of which the moisture is controlled by the moistening device 40, and it is possible to suppress final curling.

Figure 21:
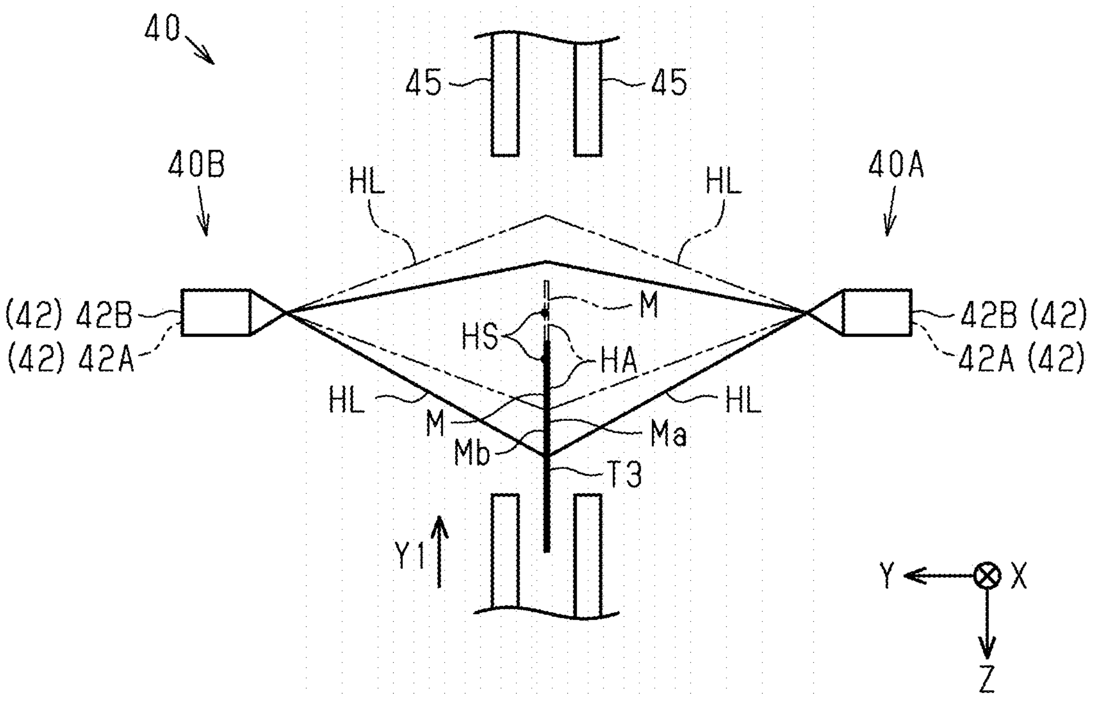
FIG. 21 is a schematic front view showing a moistening device according to a modified example.

The transport direction Y1 by the transport section 41 may not be horizontal. For example, as illustrated in FIG. 21, the transport section 41 (refer to FIG. 3) may transport the medium M from the lower side to the upper side in a direction intersecting the horizontal direction. In this case, the moistening liquid HL sprayed from the spray section 42 is affected by gravity. In FIG. 21, the medium M at a position when the spray section 42 faces the spray start position HS at which the spraying of the medium M in the moisten region HA is to be started on the assumption that the medium M is not affected by gravity is indicated by a two-dot chain line. Since the moistening liquid HL sprayed from the spray section 42 is affected by gravity, the spraying region of the moistening liquid HL indicated by the solid line in FIG. 21 descends. Therefore, the spray section 42 may start spraying before the spray section 42 faces the moisten region HA of the medium M. In detail, the spray section 42 may start the spraying of the moistening liquid HL at a position of the medium M indicated by a solid line in FIG. 21 before the spray section 42 faces the spray start position HS of the moisten region HA of the medium M. According to this configuration, it is possible to suppress the size of the moistening device 40 in the horizontal direction by transporting the medium M in a direction intersecting the horizontal direction. On the other hand, in this case, since the moistening liquid HL is sprayed in a direction intersecting the vertical direction Z, the sprayed moistening liquid HL is affected by gravity. In other words, the spraying region of the moistening liquid HL indicated by the two-dot chain line in FIG. 21 descends to the position of the spraying region of the moistening liquid HL indicated by the solid line in FIG. 21 due to the influence of gravity. In this case, by starting spraying before the spraying section 42 faces the spray start position HS of the moisten region HA, moistening can be performed from the leading end of the moisten region HA. By transporting the medium M in a direction (for example, the vertical direction Z) which intersects the horizontal direction, it is possible to suppress the moistening liquid HL from accumulating in the transport path T3. The direction intersecting with the horizontal direction is not limited to the vertical direction Z, and may be an oblique direction including both direction components of the vertical direction Z and the horizontal direction.

Figure 22:
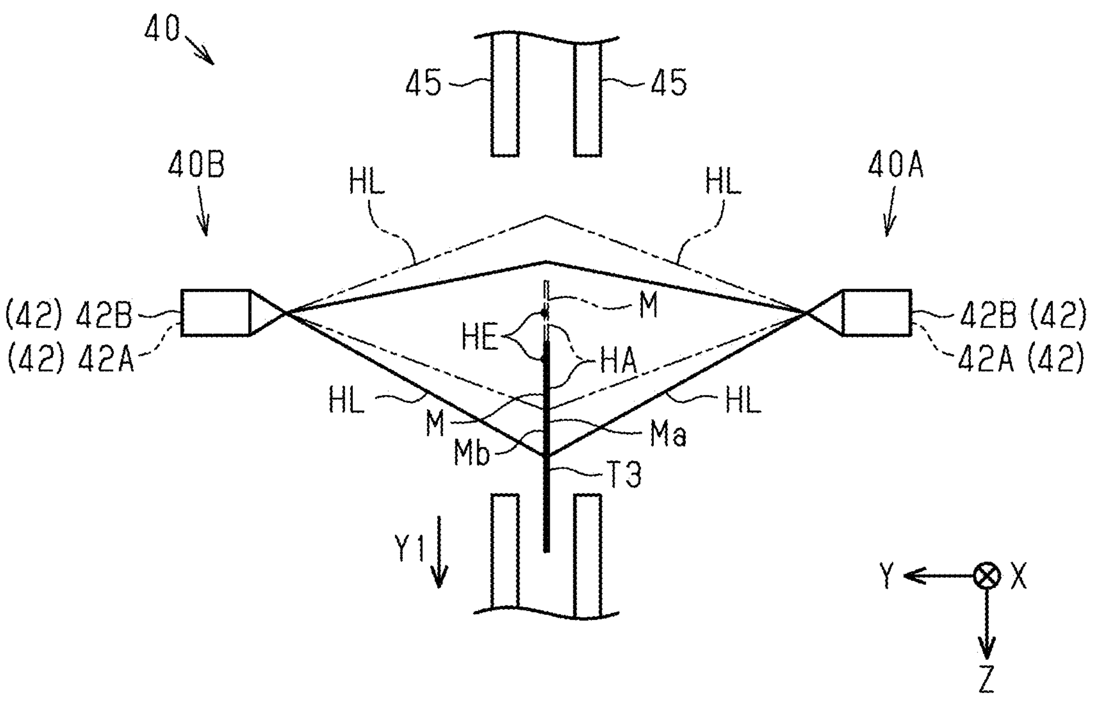
FIG. 22 is a schematic front view showing a moistening device according to a modified example.

As shown in FIG. 22, the transport section 41 may transport the medium M from the upper side to the lower side in a direction intersecting the horizontal direction. The spray section 42 may perform spraying even after the medium M no longer faces the moisten region HA of the spray section 42. In FIG. 22, the medium M at a position at which the spray section 42 faces a spray end position HE at which spraying to the medium M in the moisten region HA is to be ended when it is assumed that the medium M is not affected by gravity is indicated by a two-dot chain line. The spray section 42 may also perform spraying on the medium M indicated by the solid line in FIG. 22 after the spray section 42 no longer faces the spray end position HE of the moisten region HA of the medium M. According to this configuration, it is possible to suppress the size of the moistening device 40 in the horizontal direction by transporting in a direction (for example, the vertical direction Z) intersecting the horizontal direction. On the other hand, in this case, since the moistening liquid HL is sprayed in a direction intersecting the vertical direction Z, the sprayed moistening liquid HL is affected by gravity. In other word, the spraying region of the moistening liquid HL indicated by the two-dot chain line in FIG. 22 descends to the position of the spraying region of the moistening liquid HL indicated by the solid line in this figure due to the influence of gravity. The rear end of the moisten region HA can be moistened by performing spraying even after the spray section 42 no longer faces the spray end position HE of the moisten region HA. Further, by transporting the medium M in a direction (for example, the vertical direction Z) which intersects the horizontal direction, it is possible to suppress the moistening liquid HL from accumulating in the transport path T3. The direction intersecting with the horizontal direction is not limited to the vertical direction Z and may be an oblique direction including both direction components of the vertical direction Z and the horizontal direction.

Figure 8:
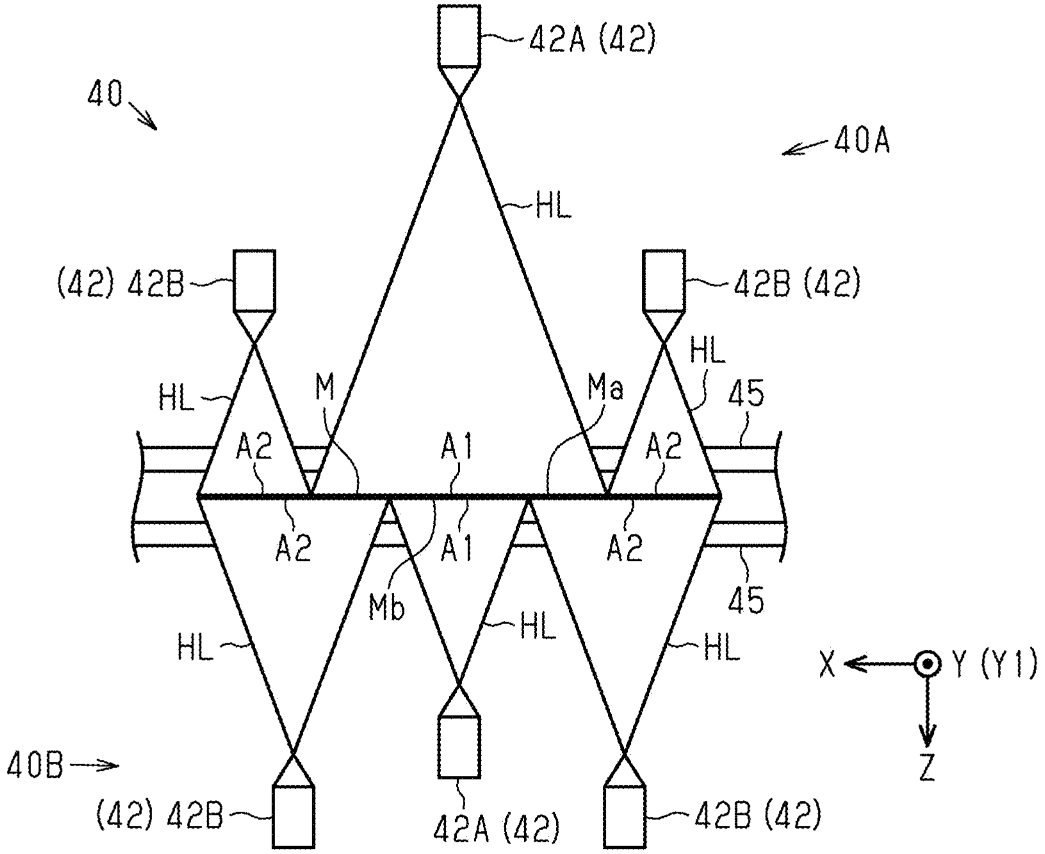
FIG. 8 is a schematic side view showing the moistening device of the third example.

In the third example shown in FIG. 8, the elevating mechanism 71 shown in FIG. 9 may be omitted from the movement section 46. By this, the first spray section 42A may be arranged at a position further away from the medium M than the second spray section 42B under a state in which the position in the vertical direction Z cannot be changed.

In the same manner as the spray section 42 of the second embodiment, the second spray section 42B included in the moistening device 40 of the first embodiment may spray the moistening liquid HL while being moved with respect to the medium M being transported. In other words, the first spray section 42A sprays the moistening liquid HL to the center region A1 shown in FIG. 19, which is the central section of the medium M in the width direction X. The second spray section 42B sprays the moistening liquid HL while moving to the edge region A2 shown in FIG. 19, which is an end section of the medium M in the width direction X. As a result, as shown in FIG. 19, the edge regions A2 are formed in a zigzag-shaped on both sides of the center region A1, and thus the spraying region can be expanded in the transport direction Y1 by a small number of spray sections 42A and 42B. Further, in each embodiment, in the configuration including the first spray section 42A, the first spray section 42A may be a movable type instead of a fixed type. For example, the first spray section 42A may be moved by the same movement section 46 as the second spray section 42B. In this case, in the second embodiment, the movement section 46 may move the first spray section 42A in synchronization with the second spray section 42B via the power transmission mechanism 92 common to the second spray section 42B.

As a method of acquiring the size information, the size information may be directly detected by the second sensor 112 or the like, or may be indirectly acquired by a user's input, size information registered for each cassette 21, size information included in the record data PD, or the like.

The acquisition section that acquires the size information and the control section 100 that performs the moistening control of the moistening device 40 based on the size information may be provided in the moistening device 40. In addition, the acquisition section and the control section 100 may be provided in a device other than the moistening device 40, such as the recording device 20, the post-processing device 60, or a host device such as a personal computer.

The target moistening amount may be set for the entire medium of one sheet or may be set for each region obtained by dividing the medium M into a plurality of regions (n regions). The target moistening amount may be acquired by the control section 100 of the recording system 10 from a server via a network.

The moistening liquid HL may be other than water. For example, the moistening liquid HL may contain a primer component in order to prevent oozing the ink of the image recorded on the medium M by the liquid ejection section 23 from bleeding. The moistening liquid HL may contain an antifreezing agent, an evaporation inhibitor, and the like.

In the first embodiment, the first spray section 42A may be pivoted.

In each of the embodiments, only one spray section 42 may be provided. Even in this configuration, it is possible to appropriately moisten substantially the entire area of the medium M by moving one spray section 42 using the movement section 46. Since the number of spray sections 42 can be minimized to one, the moistening can be optimized.

The spray section 42 may uniformly moisten the entire medium M by optimizing at least one of the swing speeds (the number of times), the distance from the medium M, and the transport speed. For example, the moistening per unit area of the medium M may be optimized by controlling the transport speed at which the medium M is transported in the moistening device 40 to a speed different from the transport speed determined by the recording mode.

The spray section 42 may be configured to change the output for spraying the moistening liquid HL. The spray section 42 may have a spread angle adjustment function configured to adjust the spread angle independently of the output, in addition to the configuration in which the spread angle is changed in accordance with the change in the output.

The spray section 42 may be moved with the movement section 46 so as to widen the moisten region in the transport direction Y1 of the medium M. For example, the spray section 42 may be pivoted about a pivoting shaft that is along the width direction X, or the spray section 42 may be moved along the transport direction Y1, which is a direction parallel to the medium M. The configuration may be such that the pivot motion of the spray section 42 is free pivotal movement via a cross joint or the like, for example.

The plurality of spray sections 42 may have different outputs for spraying the moistening liquid HL. In other words, the spray amount of the moistening liquid HL may be different between the plurality of spray sections 42.

All of the spray sections 42 may be configured to be movable by the movement section 46.

In the configuration having three or more spray sections 42, the spray sections 42 arranged at both ends may be fixed, and one spray section 42 at the center or a plurality of spray sections 42 arranged near the center may be movable.

The spray section 42 is not limited to a configuration in which the moistening liquid HL is sprayed onto both surfaces of the medium M, and may be a configuration in which the moistening liquid HL is sprayed onto only single surface of the medium M. In this case, the one surface to which the moistening liquid HL is sprayed may be a recording surface to which a liquid such as ink adheres or may be a non-recording surface opposite to the recording surface.

The water content or the moisture percentage may be a value directly detected by the third sensor 113 constituted by a moisture percentage detection sensor or the like, or may be a value indirectly estimated from conditions such as the liquid ejection amount, the temperature, the humidity, and the type of the medium M. The water content or the moisture percentage, and the presence or absence of moistening may be judged for the entire medium or may be judged for each of several divided regions.

The control section 100 may calculate the moisture percentage from data acquired in advance according to the temperature, the humidity, and the medium type.

The control section 100 may be a control section of one device. For example, in a case where the control section 100 is the first control section 101 of the recording device 20, the control section 100 may be configured to control a plurality of apparatuses other than the recording device 20. In this case, the control section 100 may give a command to a control section of another device other than the own apparatus (for example, the recording device 20) via communication means. In addition, the recording system 10 may include one or more devices that do not have an individual control section.

The each device constituting the recording system 10 may be arranged in any order for drying, inverting, and moistening. The order in which the drying is performed after the moistening is preferable because the moistening liquid HL can be dried at an early stage. The drying may be performed before the moistening. For example, the liquid ejection section 23 ejects liquid such as ink for recording. Next the liquid such as ink is semi-dried by the drying device 50, the moistening liquid HL may be sprayed to moisten the medium M. In this case, it is possible to suppress the bleeding of the record using the liquid such as ink by the moistening liquid HL. In this manner, by spraying the moistening liquid HL after the recording on the medium M by the liquid such as ink is fixed to some extent, the deterioration of the recording quality due to the moistening of the medium M may be suppressed.

The recording system 10 may not include the inversion device 30. In addition, the recording system 10 may not include the post-processing device 60. The recording system 10 may include only the recording device 20 and the moistening device 40.

The recording system 10 may be configured to include both the moistening device 40 disposed upstream of the recording device 20 and the moistening device 40 disposed downstream of the recording device 20. In other words, after the curl of the medium M before recording is removed by moistening, the curl of the medium M by the liquid such as ink after recording may be removed.

The recording device 20 may be configured to record on a long medium M such as roll paper. In this case, the moistening device 40 may moisten the medium M on which recording has been performed after the recording device 20 cuts the medium M with the cutter. In a case where the medium M is moistened upstream of the recording device 20 of this type, the moistening device 40 may moisten the long medium M such as roll paper.

The spraying of the moistening liquid HL may be output with a power at which the moistening liquid HL does not hit the medium M. For example, the medium M may be configured to pass through a moistening chamber, and the spray section 42 may be configured to spray the moistening liquid HL into the moistening chamber in order to adjust the moisture or the like of the moistened atmosphere in the moistening chamber. In this case, the spray section 42 may spray the moistening liquid HL in a direction not toward the medium M.

The plurality of spray sections 42 may be different in type of movement. For example, the spray section 42 of a pivotable type such as swinging, and the spray section 42 of a parallel movement type may be mixed. The pivotable type spray section 42 or the parallel movement type spray section 42, and the distance-variable spray section 42 capable of changing the distance to the medium M may be used in combination.

Drying by the drying device 50 is not limited to heating and may be only air blowing without heating. In addition, a configuration may be adopted in which the drying time is gained by simply lengthening the time for transporting on the transport path T4.

The intermediate unit may be divided into a plurality of devices or may be a single device viewed from the outside while internally having different roles therein.

In the recording system 10, the plurality of devices may be physically separate, or it may be configured as a single device viewed from the outside while internally having different roles therein.

A serrated roller 44A constituting the transport section 41, may be the serrated roller 44A both sides forming a pair, or the serrated roller 44A only one side. In addition, such the serrated roller 44A may be arranged on both sides sandwiching the spray section 42 in the transport direction Y1 or may be arranged on only one side.

The medium M is not limited to paper sheet or the like, and may be an envelope, board paper, fabric, a synthetic resin film, a laminate medium, or the like. In a case where the medium M at least partially contains a synthetic resin material, so long as the moistening liquid HL is a liquid other than water that can moisten the medium M. The moistening liquid HL may include an organic solvent.

The recording device 20 is not limited to a recording device (inkjet printer) which is provided with the liquid ejection section 23 that ejects liquid such as ink as a recording section that performs recording on the medium M. The recording device 20 may be, for example, a dot impact printer or a laser printer. In other words, a recording section such as a recording head that records on the medium M by the recording device 20 is not limited to the liquid ejection section 23. The recording section may be a recording head of another recording method such as a dot impact recording method or a laser recording method instead of the liquid ejection section 23. The recording device 20 may be a textile printing device.

Hereinafter, technical ideas grasped from the above-described embodiment and the modified examples will be described together with effects.

A: A moistening device for moistening a medium by spraying a moistening liquid on the medium includes a transport section for transporting the medium along a transport direction, a spray section for spraying the moistening liquid on the medium transported by the transport section, and a movement section configured to move the spray section. According to this configuration, by moving the spray section, it is possible to optimize moistening, for example, it is possible to cope with various medium sizes without increasing the number of spray sections or it is possible to make the moistening amount uniform in the entire medium. For example, in a configuration in which the entire medium is moistened by a non-movable fixed type spray section, it is necessary to arrange a plurality of spray sections at intervals in the width direction in accordance with the maximum width size of the medium, and it is difficult to optimize moistening by reducing the number of spray sections necessary for moistening. In a configuration where the entire medium is moistened by a fixed-type spray section, only a predetermined moistening method such as one where the spraying width (spraying regions) slightly overlap each other can be used, making it difficult to optimize moistening by increasing the flexibility of the moistening method, such as changing the overlap of the spraying regions. On the other hand, since a movable spray section that can be moved by the movement section is provided, it is possible to realize at least one of the optimization of moistening, in which the number of spray sections necessary for moistening is small, and the optimization of moistening by increasing the degree of freedom of the spraying method so that the spraying method can be changed with respect to various medium.

B: In the moistening device described in A, the movement section may pivot the spray section about a pivoting shaft along the transport direction. According to this configuration, by pivoting the spray section, it is possible to entirely moisten medium of various sizes without increasing the number of spray sections.

C: The moistening device described in B may include a plurality of spray sections, the plurality of spray sections may include a first spray section that sprays the moistening liquid to the center region of the medium in a width direction intersecting the transport direction and a second spray section that sprays the moistening liquid to a region different from the center region in the width direction, and the movement section may pivot the second spray section about the pivoting shaft.

According to this configuration, since the center region is a region that is moistened regardless of the width size, the spray section of the center region is not pivoted, and the spray section positioned on the end section side pivots. Therefore, it is possible to moisten the entire paper of various width sizes with only the minimum number of the spray sections to be pivoted.

D: In the moistening device described in A, the movement section may move the spray section in a width direction intersecting the transport direction. According to this configuration, by moving the spray section in the width direction, it is possible to moisten the entire paper of various width sizes without increasing the number of spray sections.

E: The moistening device described in A may include a plurality of spray sections, the plurality of spray sections may include a first spray section that sprays the moistening liquid to the center region of the medium in the width direction and a second spray section that sprays the moistening liquid to a region different from the center region in the width direction, and the movement section may move the second spray section in the width direction intersecting the transport direction. According to this configuration, since the center region is a region that is moistened regardless of the width size, the first spray section does not move, and the second spray section, which is positioned on the end section, moves in the width direction, thus it is possible to moisten the entire medium of various width sizes with only the minimum number of the spray section to movement.

F: In the moistening device described in A, the movement section may move the spray section in a direction intersecting the medium. In other words, the movement section may move the spray section in a direction intersecting with the surface of the medium to be sprayed the moistening liquid. According to this configuration, it is possible to change the range sprayed by one spray section by moving the spray section in the direction intersecting the medium. Therefore, it is possible to entirely moisten medium of various width sizes without increasing the number of spray sections.

G: In the moistening device described in F, the moistening device that moistens the medium on which recording is performed by the liquid ejection section may include a plurality of spray sections, the plurality of spray sections may include a first spray section that sprays the moistening liquid to a center region in a width direction intersecting the transport direction of the medium and a second spray section that sprays the moistening liquid to a region different from the center region in the width direction, and the first spray section may be further separated from the medium than the second spray section.

According to this configuration, the medium on which recording is performed by the liquid ejection section is also moistened by the moisture of liquid such as ink or the like. In addition, in general, the liquid ejection amount tends to increase toward the center of the medium, and the liquid ejection amount tends to decrease toward the end section. Therefore, by distancing the first spray section of the central section from the medium and bringing the second spray section of the end section closer to the medium, it is possible to relatively decrease the moistening amount of the central section and relatively increase the moistening amount of the end section, and it is possible to suppress the moistening unevenness in the width direction.

H: In the moistening device described in A, the movement section may move the spray section based on size information of the medium to be moistened. According to this configuration, by moving the spray section based on the size information (in particular, information of the width size), it is possible to moisten the entire paper of various width sizes without increasing the number of spray sections.

I: In the moistening device described in any one of above A to H, the movement section may move the spray section based on a target moistening amount. According to this configuration, by moving the spray section based on the target moistening amount, it is possible to achieve an optimal moistening amount at each location of the medium.

J: In the moistening device described in A, a plurality of spray sections may be provided, which may include a first spray section and a second spray section, and the movement section may move at least one of the first spray section and the second spray section such that a moistening amount of a first region in which the moistening liquid is sprayed only by the first spray section and a moistening amount of a second region in which the moistening liquid is sprayed by both the first spray section and the second spray section are equal to each other.

According to this configuration, since the moistening liquid sprayed from the spray section is diffused, a difference may occur in the moistening amount on the medium depending on the positional relationship with the spray section. At this time, it is possible to increase the moistening amount by moistening the second region, which has a small moistening amount on the edge side of the spray range of the first spray section, with the edge side of spray range of the second spray section. The moistening amount of the second region sprayed from both the first spray section and the second spray section is made equal to the moistening amount of the first region sprayed only from the first spray section. Therefore, it is possible to suppress unevenness of the moistening amount in the width direction of the medium.

K: In the moistening device described in any one of above A to J, the movement section may move the spray section such that the moistening amount is equal in the entire width direction intersecting the transport direction. According to this configuration, since the sprayed moistening liquid is diffused, there may be a difference in the moistening amount depending on the positional relationship with the spray section. In addition, by moving the spray section so that the moistening amount is uniform across the entire width direction, it is possible to suppress unevenness in the moistening amount in the width direction.

L: In the moistening device described in I, the moistening device moistens a medium on which recording is performed by a liquid ejection section, and the target moistening amount may be set based on a liquid ejection amount by the liquid ejection section. According to this configuration, the medium on which recording is performed by the liquid ejection section is also moistened by moisture in the liquid such as ink. Therefore, by setting the target moistening amount based on the ejection amount of the liquid such as ink, it is possible to make the final moisture percentage of the medium more appropriate.

M: In the moistening device described in any one of above A to L, the movement section may move the spray section based on a transport speed of the medium by the transport section. As the transport speed of the medium increases, the moistening amount per unit area of the medium decreases. According to this configuration, by moving the spray section based on the transport speed, it is possible to set an optimal moistening amount at each location of the medium. Since a change in the transport speed is dealt with by moving the spray section, a change in the spray amount can be suppressed. Therefore, the use amount of the moistening liquid can be suppressed.

N: In the moistening device described in any one of above A to M, moistening may not be performed when the water content of the medium is equal to or greater than a predetermined value. According to this configuration, since moistening is not executed in a case where moistening is not necessary, it is possible to avoid excessive moistening of the medium. For example, it is possible to suppress power consumption of the spray section due to a reduction in unnecessary spraying.

O: In the moistening device described in any one of above A to N, the moistening device may further include a first moistening unit that sprays the moistening liquid onto a first surface of the medium and a second moistening unit that sprays the moistening liquid onto a second surface of the medium opposite to the first surface, and each of the first moistening unit and the second moistening unit may include a spray section. According to this configuration, it is possible to appropriately adjust the moistening amount of the front and back surfaces by moistening both surfaces of the medium.

P: In the moistening device described in any one of above A to O, the transport section may transport the medium from a lower side to an upper side in a direction intersecting a horizontal direction, and the spray section may start spraying before the spray section and the moisten region of the medium face each other.

According to this configuration, it is possible to suppress the size of the moistening device in the horizontal direction by transporting the medium in a direction intersecting the horizontal direction. On the other hand, in this case, the spray section sprays the moistening liquid in a direction intersecting the vertical direction. Therefore, the sprayed moistening liquid is affected by gravity. By starting spraying before the medium faces the moisten region, moistening can be performed from the leading end of the moisten region.

Q: In the moistening device described in any one of above A to O, the transport section may transport the medium from above to below in a direction intersecting the horizontal direction, and the spray section may perform spraying even after the spray section and the moisten region of the medium no longer face each other.

According to this configuration, it is possible to suppress the size of the moistening device in the horizontal direction by transporting the medium in a direction intersecting the horizontal direction. On the other hand, in this case, the moistening liquid is sprayed in a direction intersecting the vertical direction. Therefore, the sprayed moistening liquid is affected by gravity. It is possible to moistening to the rear end of the moisten region by performing spraying even after the spray section does not face the moisten region.

R: The recording system includes a recording device that performs recording by ejecting liquid onto a medium, and the moistening device described in any one of above A to Q. When recording is performed by ejecting liquid, curling may occur when the medium is dried. According to this configuration, it is possible to suppress curling of the medium by moistening the medium using the moistening device.

S: In the recording system described in R, the recording device may perform recording on the medium moistened by the moistening device. According to this configuration, it is possible to perform recording by ejecting liquid onto the medium of which the moisture has been adjusted by the moistening device, and finally, it is possible to suppress curling of the medium after recording.

T: The recording system described in above R or S may further include a drying device that dries the medium recorded by the recording device and moistened by the moistening device. According to this configuration, the medium containing moisture due to recording and moistening is dried by the drying device, and thus it is possible to suppress curling of the medium compared to a case where moistening is not performed. In addition, the image can be fixed, and the degree of the alignment of the medium discharged from the drying device can be improved.

U: In the recording system described in any one of above R to T, the recording system may further include an inversion device that inverts the medium recorded by the recording device, and the moistening device may moisten the medium inverted by the inversion device. According to this configuration, it is possible to temporarily dry the moisture that is applied by the recording, during the inversion by the inversion device, then adjust the amount of water by the moistening device, and finally dry the moisture by the drying device.

V: The recording system described in any one of above R to U may further include an inversion device that inverts the medium on which recording has been performed by the recording device, and the inversion device may invert the medium moistened by the moistening device. According to this configuration, since the medium on which the recording and moistening are performed is inverted by the inversion device, it is possible to dry the moisture applied by the recording and moistening within the transport time.

W: The recording system described in any one of above R to V may further include a post-processing device that performs post-processing on the medium recorded by the recording device and moistened by the moistening device. According to this configuration, it is possible to suppress curling by moistening the medium on which the post-processing is performed, and thus it is possible to improve the accuracy of the post-processing.

X: The recording system described in any one of above R to W may further include an acquisition section that acquires size information of a medium to be moistened, and a control section, and the control section may move the spray section based on the size information acquired by the acquisition section. According to this configuration, since the control section moves the spray section based on the size information (particularly, information on the width size) of the medium, it is possible to moisten the entire medium having various width sizes without increasing the number of spray sections.

Y: The intermediate unit is provided between a recording device that performs recording on a medium and a post-processing device that performs post-processing on the medium on which recording has been performed by the recording device. The intermediate unit transports the medium from the recording device to the post-processing device, and includes the moistening device described in any one of above A to Q and a drying device that dries the medium. According to this configuration, it is possible to suppress curling of the medium by moistening the medium.

What is claimed is:

1. A moistening device that moistens a medium by spraying a moistening liquid onto the medium, the moistening device comprising:

a transport section configured to transport a medium along a transport direction;

a plurality of spray sections that sprays the moistening liquid onto the medium transported by the transport section, the plurality of spray sections includes a first spray section that sprays the moistening liquid onto a center region of the medium in a width direction intersecting the transport direction, and a second spray section that sprays the moistening liquid onto a region different from the center region in the width direction; and a movement section configured to move the second spray section, the movement section pivots the second spray section about a pivoting shaft that is along the transport direction.

2. The moistening device according to claim 1, wherein the movement section moves the spray section in a width direction intersecting the transport direction.

3. The moistening device according to claim 2, wherein the moistening device includes a plurality of spray sections, the plurality of spray sections includes a first spray section that sprays the moistening liquid onto a center region of the medium in the width direction and a second spray section that sprays the moistening liquid onto a region different from the center region in the width direction, and the movement section moves the second spray section in the width direction intersecting the transport direction.

4. The moistening device according to claim 1, wherein the movement section moves the spray section in a direction intersecting a medium surface to be sprayed with the moistening liquid.

5. The moistening device according to claim 4, the moistening device moistening a medium on which recording was performed by the liquid ejection section, wherein the moistening device includes a plurality of spray sections, the plurality of spray sections includes a first spray section that sprays the moistening liquid onto the center region of the medium in a width direction intersecting the transport direction and a second spray section that sprays the moistening liquid onto a region different from the center region in the width direction, and the first spray section is separated further from the medium than is the second spray section.

6. The moistening device according to claim 1, wherein the movement section moves the spray section based on size information of a medium to be moistened.

7. The moistening device according to claim 1, wherein the movement section moves the spray section based on a target moistening amount.

8. The moistening device according to claim 7, wherein the moistening device includes a plurality of spray sections, the plurality of spray sections includes a first spray section and a second spray section, and the movement section moves at least one of the first spray section or the second spray section so that a moistening amount of a first region where the moistening liquid is sprayed only by the first spray section is equal to a moistening amount of a second region where the moistening liquid is sprayed by both the first spray section and the second spray section.

9. The moistening device according to claim 7, the moistening device moistening a medium on which recording is performed by the liquid ejection section, wherein the target moistening amount is set based on an amount of liquid ejected by the liquid ejection section.

10. The moistening device according to claim 1, wherein the movement section moves the spray section based on a transport speed of the medium by the transport section.

11. The moistening device according to claim 1, wherein moistening is not performed when a water content of the medium is equal to or more than a predetermined value.

12. The moistening device according to claim 1, further comprising:

a first moistening unit configured to spray a moistening liquid on a first surface of a medium and a second moistening unit configured to spray a moistening liquid on a second surface opposite to the first surface of the medium; wherein each of the first moistening unit and the second moistening unit includes a spray section.

13. The moistening device according to claim 1, wherein the transport section transports the medium in a direction intersecting a horizontal direction from a lower side to an upper side and the plurality of spray sections starts spraying before a spray section of the plurality of spray sections and a moisten region of the medium face each other.

14. The moistening device according to claim 1, wherein the transport section transports the medium from above to below in a direction intersecting a horizontal direction, and the plurality of spray section performs spraying also after a spray section of the plurality of spray sections and the moisten region of the medium no longer face each other.

15. A recording system comprising:

a recording device that performs recording by ejecting liquid onto a medium and the moistening device according to claim 1.

16. The recording system according to claim 15 further comprising:

a drying device that dries the medium on which recording was performed by the recording device and which was moistened by the moistening device.

17. The recording system according to claim 15 further comprising:

a post-processing device that performs post-processing on the medium on which recording was performed by the recording device and which was moistened by the moistening device.

18. An intermediate unit that is provided between a recording device that performs recording on a medium and a post-processing device that performs post-processing on the medium on which recording was performed by the recording device and that transports the medium from the recording device to the post-processing device, the intermediate unit comprising:

the moistening device according to claim 1 and a drying device for drying the medium.

* * * * *